US012353694B2

(12) United States Patent
Filben et al.

(10) Patent No.: US 12,353,694 B2
(45) Date of Patent: Jul. 8, 2025

(54) SCREEN-READER ACCESSIBLE MULTISELECT USER INTERFACE COMPONENT WITH DYNAMIC STATE ANNOUNCEMENTS

(71) Applicant: Hewlett Packard Enterprise Development LP, Spring, TX (US)

(72) Inventors: Jessica Filben, Fort Collins, CO (US); Aditi Bahri, Fort Collins, CO (US); Bill Tipton, San Jose, CA (US); Eric Soderberg, Fort Collins, CO (US); Matthew Glissmann, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 244 days.

(21) Appl. No.: 18/359,671

(22) Filed: Jul. 26, 2023

(65) Prior Publication Data

US 2025/0036269 A1 Jan. 30, 2025

(51) Int. Cl.
*G06F 3/0482* (2013.01)
*G06F 3/04845* (2022.01)

(52) U.S. Cl.
CPC ........ *G06F 3/04845* (2013.01); *G06F 3/0482* (2013.01)

(58) Field of Classification Search
CPC ............................ G06F 3/04845; G06F 3/0482
See application file for complete search history.

(56) References Cited

U.S. PATENT DOCUMENTS

| | | | |
|---|---|---|---|
| 6,748,391 B1 * | 6/2004 | Schwerdtfeger | G06F 9/453 |
| | | | 707/999.102 |
| 7,735,012 B2 * | 6/2010 | Naik | G06F 3/167 |
| | | | 715/810 |
| 8,493,344 B2 | 7/2013 | Fleizach et al. | |
| 9,602,774 B2 | 3/2017 | Aldrey et al. | |
| 9,690,452 B2 | 6/2017 | Seliger et al. | |
| 10,114,609 B2 | 10/2018 | Annett et al. | |
| 10,444,934 B2 | 10/2019 | Bradley et al. | |
| 10,871,975 B2 | 12/2020 | Nguyen et al. | |
| 10,983,675 B1 | 4/2021 | Barbhaya et al. | |
| 2007/0271367 A1 | 11/2007 | Yardeni et al. | |
| 2012/0327009 A1 | 12/2012 | Fleizach | |
| 2019/0026072 A1 * | 1/2019 | Miron | G09B 21/00 |
| 2020/0334411 A1 | 10/2020 | Patel et al. | |
| 2023/0400963 A1 * | 12/2023 | Zhou | G06F 3/04847 |

* cited by examiner

*Primary Examiner* — Haoshian Shih
(74) *Attorney, Agent, or Firm* — Slater Matsil, LLP

(57) ABSTRACT

In certain embodiments, a computer-implemented method includes instructing display of a user interface that includes a multiselect component having open and closed states and providing an ability to select multiple options from an options list that includes plural options, a first portion of which is displayed in the open state. The method includes detecting activation of a control to transition from the closed to the open state and instructing, in response to detecting, in the open state, navigation to a particular option, playback by a screen reader of an announcement indicating a name of the particular option and whether the particular option is selected. The method includes instructing, in response to detecting, in the open state, selection of a first option of the first portion, playback by a screen reader of an announcement indicating a name of the first option and that the first option has been selected.

20 Claims, 15 Drawing Sheets

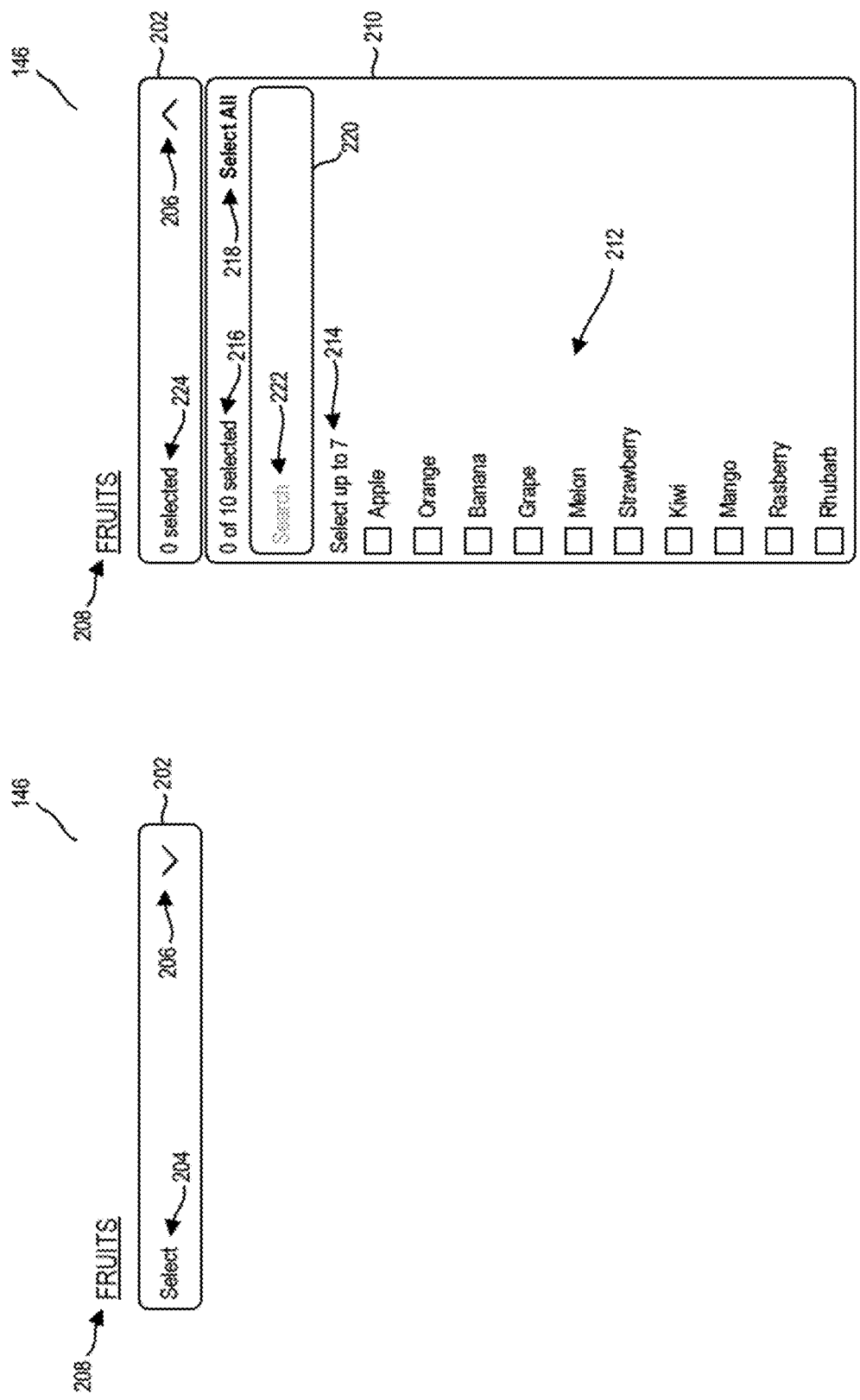

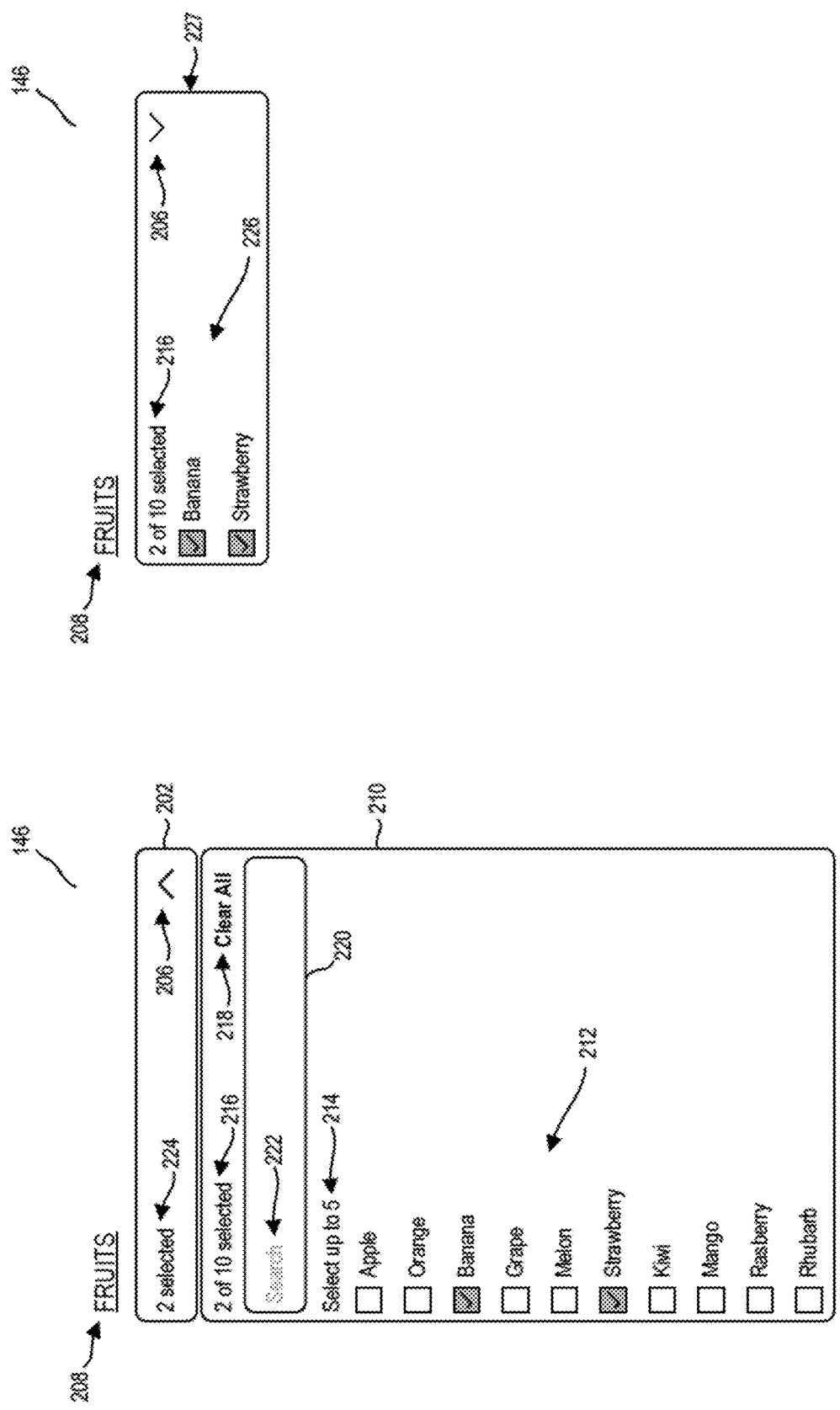

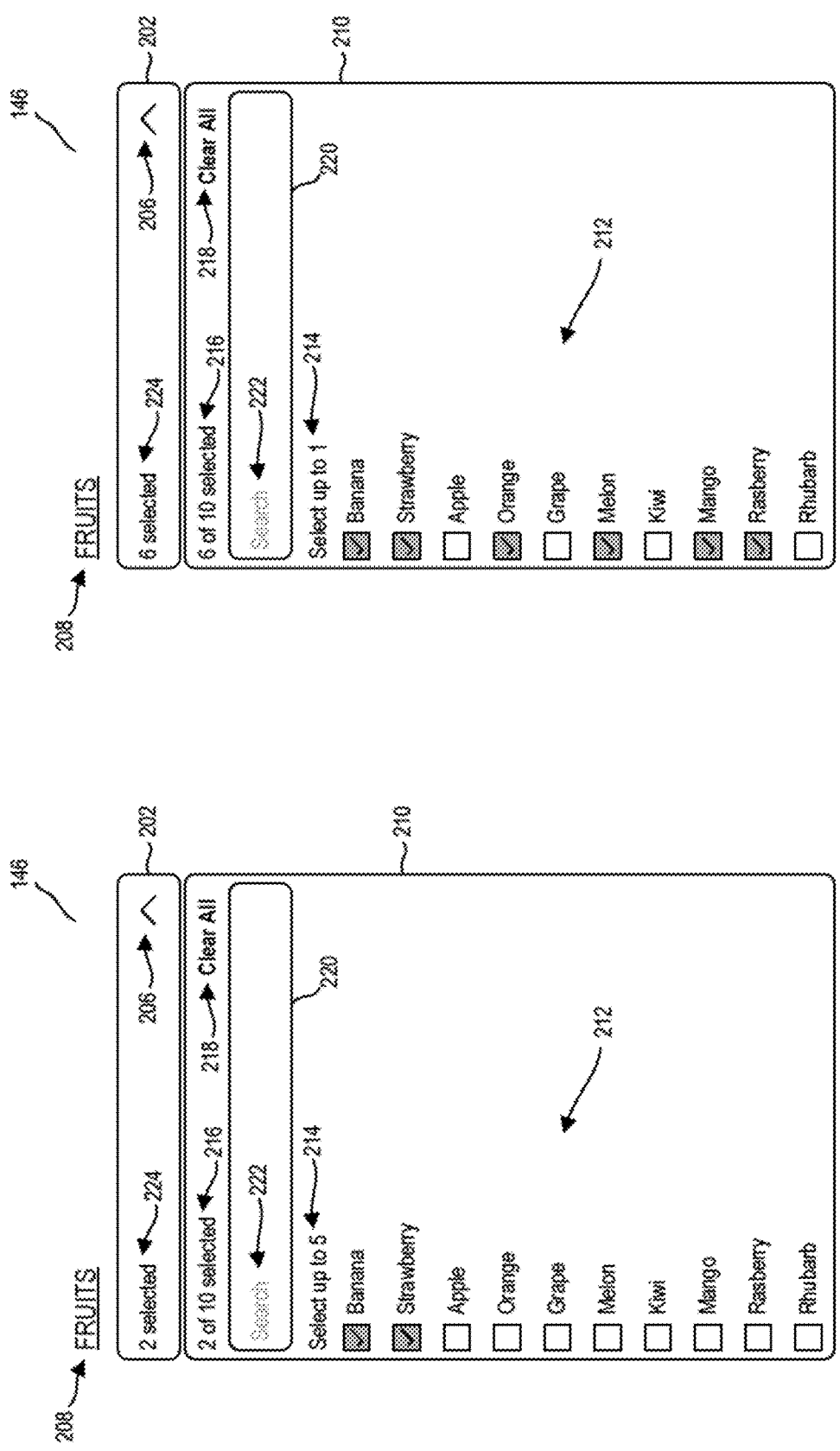

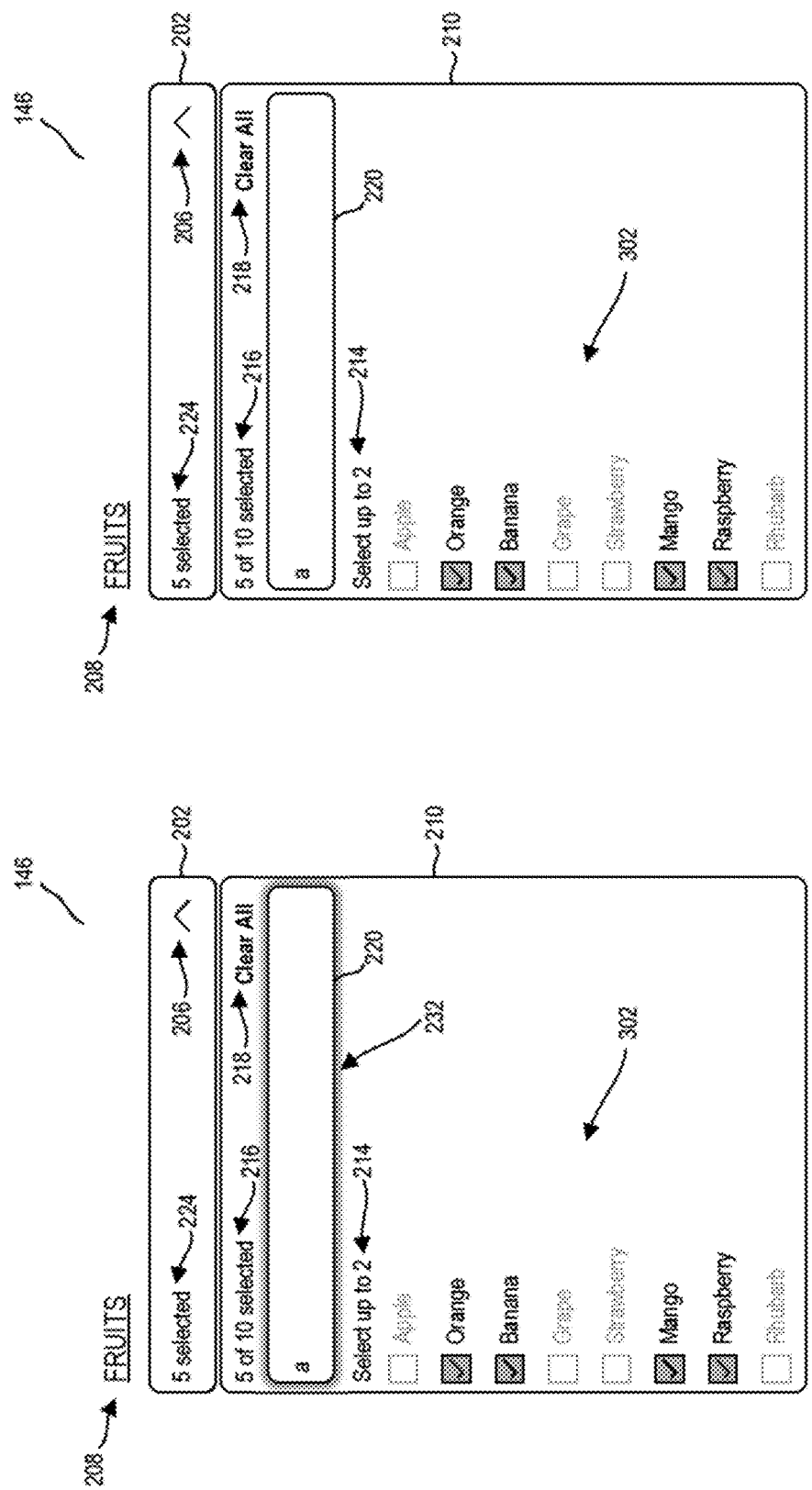

SCREEN-READER ACCESSIBLE MULTISELECT USER INTERFACE COMPONENT WITH DYNAMIC STATE ANNOUNCEMENTS

BACKGROUND

Much of the content available on the Internet or other networked computing environments is presented visually to a user. For example, content provided by web sites or web applications generally is visually presented in a display. Unfortunately, this can make accessing this type of information difficult for certain users, such as those who are blind; who are visually impaired, illiterate, or have a learning disability; or who simply would prefer to consume and/or interact with the information differently.

BRIEF DESCRIPTION OF THE DRAWINGS

For a more complete understanding of this disclosure, and advantages thereof, reference is now made to the following descriptions taken in conjunction with the accompanying drawings, in which:

FIGS. 2A-2H illustrate a set of user interface screens having a multiselect component at various stages of interaction, according to certain embodiments;

FIGS. 3A-3E illustrate a set of user interface screens having a multiselect component at various stages of interaction, according to certain embodiments;

DETAILED DESCRIPTION OF ILLUSTRATIVE EMBODIMENTS

Figure 1:
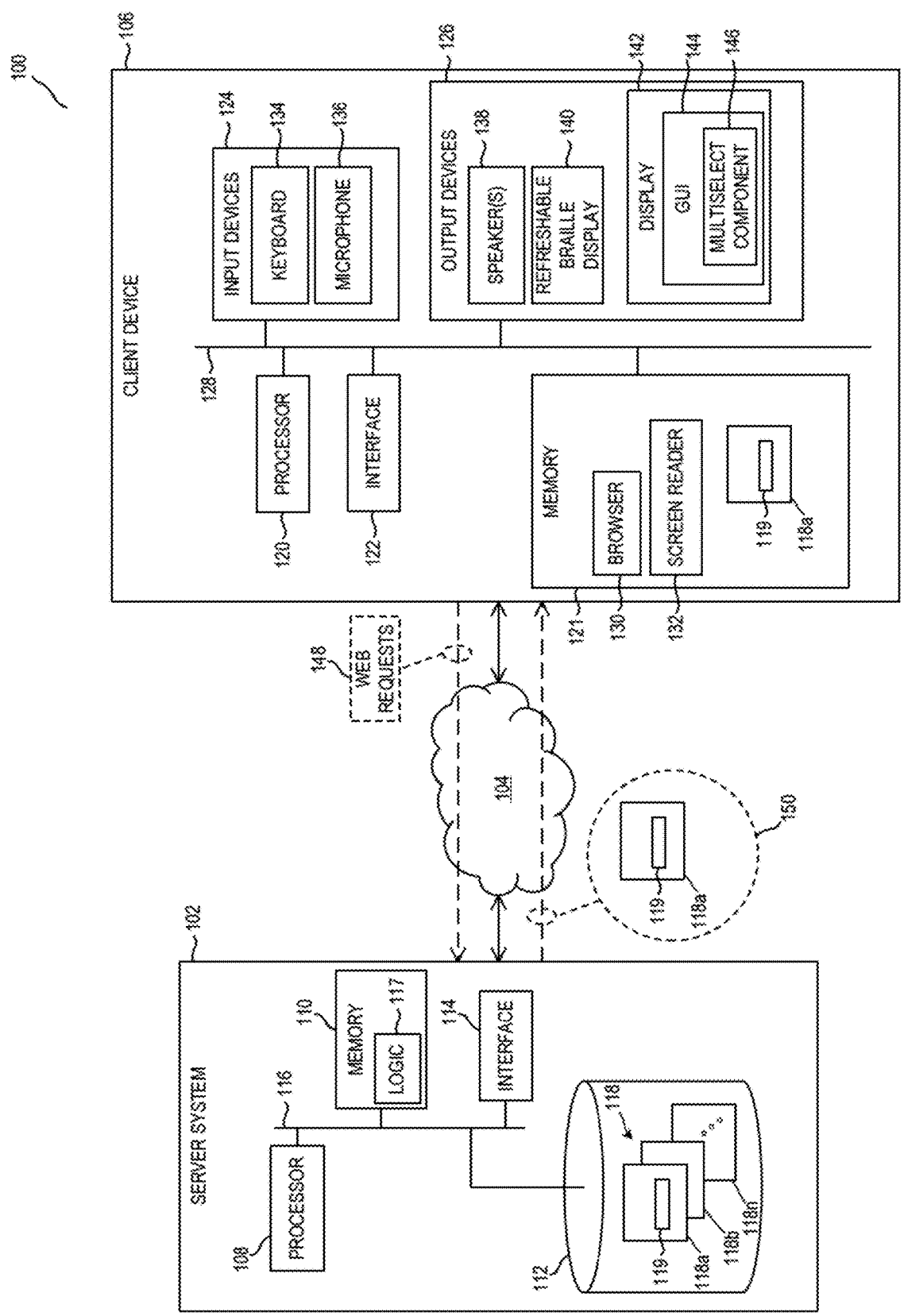
FIG. 1 illustrates an example system for providing a graphical user interface (GUI) having multiselect component, according to certain embodiments.

One assistive technology that aids users who cannot or prefer not to view the information presented on a display is a screen reader. Screen readers typically are software programs that use a text-to-speech (or text-to-braille) engine to translate information presented on the display to another format, such as audio, which can be heard through speakers or earphones, or braille, which can be read using a braille output device. For example, screen readers can read displayed text to a user and/or audibly provide information regarding one or more controls or other objects that are displayed, such as to assist a user with navigating the page. Users can interact with the screen reader, such as by using predefined inputs (e.g., keys of a keyboard or via another user input device).

When using a screen reader to browse a web page, the screen reader software translates the markup language (e.g., hypertext markup language (HTML)) structure of the web page into audible sounds and/or braille that enables the user to navigate and interact with the respective elements on the web page. For example, the screen reader will audibly read various elements such as menus, dropdown lists, and/or icons displayed on the screen as the user navigates through each element of the web page.

Certain types of user interface elements may be particularly difficult to navigate when using a screen reader. One such user interface element is a multiple selection (multiselect) component, sometimes referred to as a SelectMultiple Component. A multiselect component may be presented using a drop-down list of selectable options for a given input field. As the name suggests, rather than being limited to selecting only one option from the drop-down list, a user may select multiple options from the drop-down list. For example, if a user is searching a clothing store's web site (or web application) for pants, the web site may present filtering options to limit the displayed available pants by color (e.g., blue, grey, black, white, and brown). The user may select multiple color options (black and grey), while leaving others unselected (blue, white, and brown). While this is a simple example, often such drop-down lists can be quite long.

Some web pages and web applications leave screen reader users with a frustrating experience when encountering multiselect components, both from an announcement perspective and an interaction perspective. For example, screen reader users may be provided with more information than is needed, such as by the screen reader reading the entire list of items from the drop-down menu when only the presently-focused item or a summary of those selected would do, or may be provided with inadequate information to understand when a selection from the drop-down list has been made or what options are available.

Certain embodiments of this disclosure provide a multiple selection component for use in a GUI, such as a GUI of a web page or web application, that facilitates selecting one or more of a set of options in a manner that is accessible to screen reader users and is keyboard navigable for those who cannot or prefer not to use mouse interaction with the interface. For example, certain embodiments improve consumption and navigation of web pages and web applications when using a screen reader.

Certain embodiments improve an ability of a screen reader to present options related to a multiselect component to a user, which may allow screen reader users to more effectively understand and interact with a multiselect component. Certain embodiments use unique screen reader announcements and roles (e.g., Accessible Rich Internet Applications (ARIA) roles). Certain embodiments include semantic cues in code for a multiselect component that prompt a browser to display certain information and a screen reader to announce certain information that provides improved context and status for users of screen readers when viewing and/or interacting with a multiselect component. Certain embodiments are fully keyboard accessible. The display of elements may be performed by a web browser in association with a display, and the reading/playback of the announcements may be performed by a screen reader in association with an output device (e.g., a speaker or braille output device). The code associated with certain embodiments of this disclosure is implemented using a suitable combination of HTML, CSS, JavaScript, ARIA attributes, etc.

Certain embodiments provide one or more of the following example features to assist users of screen readers with navigating a multiselect component of a GUI.

For example, in response to a user opening the multiselect component (e.g., opening a drop-down list that includes a list of options), certain embodiments instruct announcing the option on which the user is currently focused (e.g., to which the user has navigated) rather than automatically reading the entire list of options, and also announcing a selection status (e.g., selected or not selected) of the currently-focused option, potentially with additional information related to a total quantity of selected options.

As another example, in response to a user selecting/deselecting an option from the drop-down list, certain embodiments instruct announcing the selection/deselection, potentially with additional information related to a total quantity of selected options.

As another example, certain embodiments instruct displaying and announcing a quantity of selected options (e.g., X of Y selected) at one or more instances.

As another example, with one or more options selected and the multiselect component being returned to a closed state (e.g., the drop-down list is closed), certain embodiments instruct displaying a selection summary that includes some or all of the selected options and providing associated announcements.

As another example, in response to the selected options exceeding a threshold, certain embodiments instruct truncating the list of selected options in the selection summary, displaying an indicator that more selected options are available (and possibly indicating a quantity), and providing an ability to access those additional selected options by reopening the multiselect component, all with associated announcements.

As another example, in response to a user reopening the multiselect component (e.g., reopening a drop-down list that includes a list of options), certain embodiments sort selected options to the top of the list of available options.

As another example, certain embodiments provide an ability to deselect from the selection summary and provide associated announcements.

As another example, with the multiselect component open (e.g., the drop-down list is open), certain embodiments instruct providing a search field for searching the list of options, along with associated announcements. Among other features, the search operations may include: (1) jumping to the first matching item in the list (and announcing) in response to the user inputting a search execution command (e.g., pressing Enter); and (2) searching and providing associated feedback in real time, as each individual search character is input, such that when no matches are found, an immediate announcement is made without additional input characters being required or the user inputting a search execution command (e.g., pressing Enter).

This disclosure describes these and other features of a multiselect component.

FIG. 1 illustrates an example system 100 for providing a GUI having multiselect component, according to certain embodiments. In the illustrated example, system 100 includes a server system 102, a network 104, and a client device 106. Although system 100 is illustrated and described as including particular components in a particular arrangement, this disclosure contemplates system 100 including any suitable components in any suitable arrangement.

In general, server system 102 is configured to receive via network 104 requests for web content (e.g., web pages) from client device 106, and to communicate, in response, web content (e.g., web pages) that have a multiselect component (or programming to generate a multiselect component) to client device 106 via network 104. The programming for the multiselect component includes certain instructions to cause a first application (e.g., a browser) to display the multiselect component and to instruct a second application (e.g., a screen reader) application to make certain announcements, some of which may be in response to certain user input and navigation in association with the multiselect component.

Server system 102 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal digital assistant (PDA), one or more Internet Protocol (IP) telephones, one or more cellular/smart phones, one or more servers, a server pool, switch, router, disks or disk arrays, one or more processors within these or other devices, or any other suitable processing device. Server system 102 may be a stand-alone computer or may be a part of a larger network of computers associated with an entity. In certain embodiments, server system 102 is a web server.

Server system 102 may include one or more processors 108, one or more memories 110, one or more storage devices 112, one or more interfaces 114, and one or more links 116, all referred to throughout the remainder of this disclosure in the singular for simplicity. Server system 102 may be implemented using any suitable combination of hardware, firmware, and software.

Processor 108 may include one or more programmable logic devices, microprocessors, controllers, or any other suitable computing devices or resources or any combination of the preceding. Processor 108 may work, either alone or with other components of server system 102, to provide a portion or all of the functionality of server system 102.

Memory 110 may take the form of volatile or non-volatile local or remote devices capable of storing information, including, without limitation, magnetic media, optical media, random access memory (RAM), read-only memory (ROM), removable media, or any other suitable memory device. In the illustrated example, memory 110 stores logic 117, which may include programming for execution by processor 108, the programming including instructions to perform some or all of the functionality of server system 102. For example, logic 117 may include instructions for receiving web requests from client device 106, retrieving suitable web content in response to those web requests from client device 106, and initiating transmission of responses to client device 106.

Storage device 112 may take the form of volatile or non-volatile memory including, without limitation, magnetic media, optical media, RAM, ROM, removable media, or any other suitable memory device. In certain embodiments, storage device 112 may include one or more databases, such as one or more structured query language (SQL) servers or relational databases.

Storage device 112 may be a part of or separate from server system 102. Additionally, storage device 112 may be local to or remote from server system 102. Furthermore, storage device 112 may be part of or distinct from memory 110.

Storage device 112 stores web content 118, shown to include web content 118a, 118b, through 118n. Web content 118 may include code for web pages, web applications, or other suitable content that server system 102 may provide in some form to client device 106 via network 104. For example, web content 118 may include any suitable combination of web pages and/or web applications that include any suitable combination of markup language code (e.g., HTML code, extensible markup language (XML) code, or the like), stylesheet code (e.g., Cascading Style Sheets (CSS) code), scripts (e.g., JavaScript code), multimedia files, or any other suitable content.

Some or all of web content 118 includes multiselect logic 119, which may represent code or other suitable programming for a multiselect component (e.g., multiselect component 146, described below). Multiselect logic 119 may include instructions for generating a multiselect component according to certain embodiments of this disclosure. For example, multiselect logic 119 may include any suitable combination of web pages and/or web applications that include any suitable combination of markup language code (e.g., HTML code, extensible markup language XML code, or the like), stylesheet code (e.g., CSS code), scripts (e.g., JavaScript code), multimedia files, or any other suitable code. In the illustrated example, web content 118a includes multiselect logic 119.

Interface 114 represents any suitable computer element that can facilitate, among other operations, receiving information from network 104 and/or transmitting information through network 104. For example, interface 114 of server system 102 may receive requests from client device 106 for web content 118 and/or transmit web content 118 to client device 106 in response to those requests. Interface 114 represents any port or connection, real or virtual, including any suitable combination of hardware, firmware, and software, including protocol conversion and data processing capabilities, to communicate wired and/or wireless traffic through a local area network (LAN), wide area network (WAN), or other communication system that allows server system 102 to exchange information with other components of system 100.

Network 104 facilitates wireless or wireline communication. Network 104 may communicate, for example, IP packets, Frame Relay frames, Asynchronous Transfer Mode (ATM) cells, voice, video, data, and other suitable information between network addresses. Network 104 may include one or more LANs, radio access networks (RANs), metropolitan area networks (MANs), WANs, mobile networks (e.g., using WiMax (802.16), WiFi (802.11), 3G, 4G, 5G, or any other suitable wireless technologies in any suitable combination), all or a portion of the global computer network known as the Internet, and/or any other communication system or systems at one or more locations, any of which may be any suitable combination of wireless and wireline.

Link 116 may include any suitable wired or wireless communication medium for the components of server system 102 to communicate with one another. For example, link 116 may include any suitable combination of a bus or communication network.

Turning to client device 106, client device 106 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, one or more cellular/smart phones one or more servers, a server pool, one or more processors within these or other devices, or any other suitable processing device. Client device 106 may be a stand-alone computer or may be a part of a larger network of computers associated with an entity. Client device 106 may be implemented using any suitable combination of hardware, firmware, and software. Client device 106 may be one of a number of client devices 106.

Client device may include one or more processors 120, one or more memories 121, one or more interfaces 122, one or more input devices 124, one or more output devices 126, and one or more links 128, some of which may be referred to throughout the remainder of this disclosure in the singular for simplicity. Client device 106 may be implemented using any suitable combination of hardware, firmware, and software.

Processor 120 may include one or more programmable logic devices, microprocessors, controllers, or any other suitable computing devices or resources or any combination of the preceding. Processor 120 may work, either alone or with other components of client device 106, to provide a portion or all of the functionality of client device 106.

Memory 121 may take the form of volatile or non-volatile local or remote devices capable of storing information, including, without limitation, magnetic media, optical media, RAM, ROM, removable media, or any other suitable memory device. In the illustrated example, memory 121 stores browser 130 and screen reader 132, each of which may include programming for execution by processor 108, the programming including instructions to perform some or all of the functionality of client device 106.

Browser 130 may include any suitable application (or combination of applications) that is operable to access network 104 (e.g., the Internet). For example, browser 130 may include a web browser. Browser 130 may be used to access web content 118, such as by facilitating requests (e.g., web requests 148) for web content 118 from server system 102 and receiving web content 118 from server system 102 (e.g., as response 150). Browser 130 may be configured to display web content 118 (e.g., as, or as part of, GUI 144 in display 142), and, if applicable, facilitate interaction with web content 118. Examples of browser 130 may include GOOGLE CHROME by GOOGLE LLC, SAFARI by APPLE INC., FIREFOX by MOZILLA, or MICROSOFT EDGE BY MICROSOFT CORPORATION, though this disclosure contemplates using any suitable browser as browser 130.

Screen reader 132 may be a software program that uses a text-to-speech (or text-to-braille) engine to translate information presented on a display to another format, such as audio, which can be heard through speakers or earphones, or braille, which can be read using a braille output device. For example, screen readers can read displayed text to a user and/or audibly provide information regarding one or more controls or other objects that are displayed, such as to assist a user with navigating the web page. Users can interact with the screen reader, such as by using predefined inputs (e.g., keys of a keyboard or via another user input device). Screen reader 132 could be a software application installed on client device 106. In certain embodiments, screen reader 132 could be implemented as an extension to browser 130. Examples of screen reader 132 may include Job Access With Speech (JAWS), VoiceOver, NonVisual Desktop Access (NVDA), and Window Eyes, though this disclosure contemplates using any suitable screen reader application as screen reader 132.

Interface 122 represents any suitable computer element that can facilitate, among other possible operations, receiving information from network 104 and/or transmitting information through network 104. For example, interface 122 of client device 106 may transmit requests for web content 118 to server system 102 and receive responses with web content 118 from server system 102 in response to those requests. Interface 122 represents any port or connection, real or virtual, including any suitable combination of hardware, firmware, and software, including protocol conversion and data processing capabilities, to communicate wired and/or wireless traffic through a LAN, WAN, or other communication system that allows server system 102 to exchange information with other components of system 100.

Input devices 124 may include a keyboard 134 and microphone 136. Of course, client device 106 may include other input devices 124, such as a mouse and/or trackpad.

Keyboard 134 may be configured to receive input through one or more keys to facilitate manipulating navigation via one or a combination of keys. Microphone 136 may be configured to receive voice input to facilitate manipulating navigation via voice input.

Output devices may include a speakers 138, a refreshable braille display 140, and a display 142. Of course, client device 106 may include other input devices 124, such as a mouse and/or trackpad. Speakers 138 may be configured to convert audio signals into sounds. Refreshable braille display 140 may be an electro-mechanical device configured to display braille characters, such as via pins raised through holes in a surface, which may provide an alternative mechanism (to display 142) for reading text output. Screen reader 132 may facilitate announcement being made via one or more of speakers 138 or refreshable braille display 140 according to instructions, such as instructions in or otherwise generated by multiselect logic 119 for example.

Display 142 is an output device for visually presenting information to a user. For example, display 142 may visually present a GUI 144. As a particular example, GUI 144 may be presented by and/or as part of a browser 130, for example as part of a web page or web application (e.g., we content 118a). In certain embodiments, GUI 144 may include a multiselect component 146, according to certain embodiments of this disclosure.

Link 128 may include any suitable wired or wireless communication medium for the components of client device 106 to communicate with one another. For example, link 128 may include any suitable combination of a bus or communication network.

In general, client device 106 may be used by end users to perform a variety of computing functions, including using one or more software applications. Taking browser 130 as an example application, a user may use browser 130 to interact with a web site and/or web application, also making use of one or more input devices 124 and one or more output devices 126. For example, a user may submit a web request 148 via browser 130 to server system 102, such as via a GUI 144 presented via browser 130. Web request 148 may be a request for web content 118. Server system 102 may receive web request 148. In response to web request 148, server system 102 may identify web content 118a as being responsive to web request 148 and facilitate sending of response 150, which includes web content 118a, to client device 106. Client device 106 may receive web content 118a from server system 102, which may include storing web content 118a, such as in memory 121 of client device 106. Browser 130 may obtain web content 118a and facilitate displaying some or all of web content 118a as GUI 144 in display 142. While given the same reference numeral (e.g., 118a), web content 118a on server system 102, web content 118a in transit (as part of response 150, described below), or web content 118a stored on client device 106 might or might not match exactly.

As described above, client device 106 may include a screen reader 132, which may provide an alternative mechanism for interacting with content, such as content displayed in display 142 (e.g., content displayed by browser 130 as GUI 144). In certain embodiments, this content may be web content 118 (e.g., web content 118a), such as web pages of a web site and/or a web application. A screen reader 132 may output, as one or more of audio output via speakers 138 or braille output via refreshable braille display 140, information regarding what is displayed in GUI 144, what navigational actions are available regarding what is displayed in GUI 144, what actions are (or have been) taken with respect to information displayed in GUI 144, and/or other suitable information.

To that end, designers of web sites and/or web applications may include certain code in the web site and/or web application code to facilitate informing screen reader 132 regarding what information (whether text, image, or other) is displayed, available navigation options, a state of navigation, or other information. This code may be included in the HTML, JavaScript, or other code for implementing the web site and/or web application, and may itself be coded using HTML, JavaScript, or other suitable code.

Also, it may be desirable for GUIs that are screen-reader-friendly to also be keyboard navigable or audio navigable, since for certain users navigating a GUI in a manner that requires visibly seeing the GUI may be difficult or impossible.

GUI 144 may include a multiselect component 146, which may be a user interface element that allows a user to select multiple options from a group of available options, such as multiple options from a drop-down list. Certain embodiments provide a multiselect component 146 for use in GUI 144 that facilitates selecting one or more of a set of options in a manner that is accessible to those with disabilities and is keyboard navigable for those who cannot or prefer not to use mouse interaction with the interface. For example, certain embodiments improve navigation of web pages associated with web applications or other web sites when using a screen reader.

Certain embodiments improve an ability of screen reader 132 to present options related to a multiselect component 146 to a user, which may allow screen reader users to more effectively understand and interact with multiselect component 146. Certain embodiments use unique screen reader announcements and roles (e.g., ARIA roles). Certain embodiments include semantic cues in code for multiselect component 146 that prompt browser 130 to display certain information and screen reader 132 to announce certain information that provides improved context and status for users of screen reader 132 when viewing and/or interacting with multiselect component 146. Certain embodiments are fully keyboard accessible (e.g., using keyboard 134). The display of elements may be performed by browser 130 in association with display 142, and the reading of the announcements may be performed by screen reader 132 in association with an output device 126 (e.g., speaker(s) 138 and/or refreshable braille display 140). Certain code (multiselect logic 119) associated with certain embodiments of this disclosure is implemented using a suitable combination of HTML, CSS, JavaScript, ARIA attributes, etc.

Certain embodiments of multiselect logic 119 and/or multiselect component 146 provide one or more features to assist users of screen readers with navigating multiselect component 146 of GUI 144.

For example, in response to a user opening multiselect component 146 (e.g., opening a drop-down list that includes a list of options), certain embodiments instruct announcing the option on which the user is currently focused (e.g., to which the user has navigated) rather than automatically reading the entire list of options, and also announcing a selection status (e.g., selected or not selected) of the currently-focused option, potentially with additional information related to a total quantity of selected options.

As another example, in response to a user selecting/deselecting an option from the drop-down list, certain embodiments instruct announcing the selection/deselection, potentially with additional information related to a total quantity of selected options.

As another example, certain embodiments instruct displaying and announcing a quantity of selected options (e.g., X of Y selected) at one or more instances.

As another example, with one or more options selected and multiselect component 146 being returned to a closed state (e.g., the drop-down list is closed), certain embodiments instruct displaying a selection summary that includes some or all of the selected options and providing associated announcements.

As another example, in response to the selected options exceeding a threshold, certain embodiments instruct truncating the list of selected options in the selection summary, displaying an indicator that more selected options are available (and possibly indicating a quantity), and providing an ability to access those additional selected options by reopening the multiselect component, potentially with associated announcements.

As another example, in response to a user reopening multiselect component 146 (e.g., reopening a drop-down list that includes a list of options), certain embodiments sort selected options to the top of the list of available options.

As another example, certain embodiments provide an ability to deselect from the selection summary and provide associated announcements.

As another example, with multiselect component 146 open (e.g., the drop-down list is open), certain embodiments instruct providing a search field for searching the list of options, along with associated announcements. Among other features, the search operations may include: (1) jumping to the first matching item in the list (and announcing) in response to the user inputting a search execution command (e.g., pressing Enter); and (2) searching and providing associated feedback in real time, as each individual search character is input, such that when no matches are found, an immediate announcement is made without additional input characters being required or the user inputting a search execution command (e.g., pressing Enter).

The code for generating multiselect component 146 may be included in the HTML, JavaScript, or other code for implementing the web site and/or web application, and may itself be coded using HTML, JavaScript, or other suitable code.

To illustrate various aspects of a multiselect component 146 according to certain embodiments of this disclosure, FIGS. 2A-2H and FIGS. 3A-3E illustrate example sets of GUI screens of a display having a multiselect component 146, according to certain embodiments. Operation may transition between GUI screens in response to user interaction with the screens, including in response to user interaction with multiselect component 146 included in the user interface screens. Throughout the description of FIGS. 2A-2H and 3A-3E, various announcements that may be instructed by multiselect logic 119 for screen reader 132 to play back (e.g., in response to navigation to a particular element or a particular interaction) are described. Other announcements are possible. Furthermore, to avoid repetition, each possible instance where a particular announcement may be made is not necessarily described and instead a representative announcement is described with the understanding that similar announcements could be made, where appropriate. Additionally, any of the identified announcements might or might not be included and/or may be phrased differently in any given embodiment. Furthermore, additional and/or different announcements may be made.

Following the description of FIGS. 2A-2H and 3A-3E, additional details regarding FIG. 1 are described.

FIGS. 2A-2H illustrate a set of user interface screens having a multiselect component 146 at various stages of interaction, according to certain embodiments. In conjunction with certain of FIGS. 2A-2H, one or more announcements are described as being initiated by multiselect logic 119.

As illustrated in FIG. 2A, multiselect component 146 is in a closed state and includes an input field 202. Input field 202 includes an indicator 204 ("Select") that indicates that multiselect component 146 is available for inputting selections.

Input field 202 may include a control 206, which may be used to transition multiselect component from a closed state to an open state and from an open state to a closed state. As multiselect component 146 is in a closed state in FIG. 2A, control 206 indicates that multiselect component 146 can be opened by selecting control 206, and selection of control 206 causes multiselect component 146 to transition from a closed state to an open state. In this particular example, control 206 with multiselect component 146 in the closed state is shown as a downward arrow, or chevron.

Additionally, multiselect component 146 may include a label 208. Label 208 may indicate, for example, an umbrella category for the options from which a selection is to be made using multiselect component 146. In this example, label 208 is "FRUITS," indicating that the options from which a selection is to be made using multiselect component 146 are fruits. The term "label" may correspond to the HTML <label> tag. For purposes of the example illustrated in FIGS. 2A-2H, label 208 is persistently shown.

In certain embodiments, multiselect logic 119 may instruct browser 130 to display a user interface (e.g., GUI 144) that includes multiselect component 146. Multiselect component 146 may have an open state and a closed state. Multiselect logic 119 may instruct that multiselect component 146 initially be displayed in a closed state.

In certain embodiments, in response to a user navigating to input field 202 of multiselect component 146, multiselect logic 119 may instruct playback by screen reader 132 of an announcement indicating label 208 (e.g., "FRUITS") for multiselect component 146 and an availability of activating control 206 in input field 202 for transitioning multiselect component 146 from the closed state to an open state. The area of a GUI to which a user has navigated also may be referred to as the user's focus. As just one example, in response to detecting navigation to input field 202 of multiselect component 146, multiselect logic 119 may instruct playback by screen reader 132 of an announcement stating: "<Name><x number> selected. Select listbox popup collapsed," or "Fruits. Zero selected. Select listbox popup collapsed."

As illustrated in FIG. 2B, in response to selection of control 206, multiselect component 146 has transitioned from a closed state to an open state, revealing selection area 210.

Selection area 210 includes an options list 212 that lists options for selection by a user. In this example, the options are fruits, and options list 212 includes ten selectable options arranged in a vertical list. Each selectable option includes a selection box and associated text (e.g., the name of a type of fruit) positioned adjacent to the selection box. If applicable, selection area 210 may include a selection instruction 214 informing a user of a limit on how many options from options list 212 may be selected or providing any other suitable instruction. In this example, selection instruction 214 is "Select up to 7," informing a user that up to 7 options from options list 212 may be selected.

Selection area 210 may further include a selected quantity indicator 216, which may indicate a number of options from options list 212 that have been selected out of a total number of available options.

Selection area 210 may further include a quick action selection control 218. When multiselect component 146 is in an open state, quick action selection control 218 may provide an option to select all options in options list 212. In such an example, quick action selection control 218 may be "Select All" or the like. In an example such as the illustrated example in which selecting all options would exceed the limit indicated by selection instruction 214, selecting the quick action selection control 218 to select all available options might select the first set of options up to the limit indicated by selection instruction 214, or may be coded to proceed in another desired manner.

Selection area 210 may further include a search field 220. When no content is entered in search field 220, search field 220 may include a search indicator 222 (shown as "Search" and in a dimmed manner, for example), indicating that the purpose of search field 220 is for searching. In certain embodiments, search field 220 may be used to search options list 212 for options matching the search parameters entered into search field 220. Additional details regarding the operation of search field 220 and associated announcements are described in greater detail below with reference to FIGS. 3A-3E.

Continuing with FIG. 2B, in the illustrated example, selected quantity indicator 216 and quick action selection control 218 are positioned above search field 220, and selection instruction 214 and options list 212 are positioned below search field 220. While this arrangement might present certain organizational and technical advantages, such as efficiently presenting this information in an order that facilitates ease of interaction with multiselect component 146, including to a user of screen reader 132, this disclosure contemplates arranging the information of selection box 210 in any suitable manner.

With multiselect component 146 in the open state, certain changes may be made to input field 202. For example, indicator 204 from FIG. 2A (e.g., "Select") may be changed to selected quantity indicator 224, which may indicate the number of options from options list 212 that have been selected. In the illustrated example, selected quantity indicator 224 is different than selected quantity indicator 216 in that selected quantity indicator 224 simply lists the number of options that have been selected. Of course, this disclosure contemplates implementing selected quantity indicator 216 and selected quantity indicator 224 to be the same or different. As another example, with multiselect component 146 in the open state, control 206 has been changed to indicate that multiselect component 146 can be closed by selecting control 206, and selection of control 206 causes multiselect component 146 to transition from an open state to a closed state. In this particular example, control 206 with multiselect component 146 in the open state is shown as an upward arrow, or chevron.

In general, input field 202 may be designed to provide a succinct presentation of what a user has done (e.g., via selected quantity indicator 224), what a user can do (e.g., via quick action selection control 218 in a first (e.g., open) state, such as "Select All"), and/or how to reset to a default state (e.g., via quick action selection control 218 in a second (e.g., closed) state, such as "Clear All," as described below).

Although input field 202 and selection area 210 are illustrated as separate areas, input field 202 and selection area 210 may be merged or further divided into additional areas. As just one example, input field 202 and selection area 210 could be merged, with selected quantity indicator (either in the form of selected quantity indicator 216 or selected quantity indicator 224), quick action selection control 218, and control 206 being positioned above search field 220, and with selection instruction 214 (if included) and options list 212 being positioned below search field 220.

In certain embodiments, multiselect logic 119 may detect activation of control 206 to transition multiselect component 146 from a closed state (e.g., of FIG. 2A) to an open state (e.g., of FIG. 2B). Multiselect component 146 may provide an ability to select multiple options from options list 212 that includes a plurality of options. In certain embodiments, a first displayed portion of the plurality of options of options list 212 are displayed in the open state. For example, the first displayed portion could be some or all of the plurality of options of options list 212. In the illustrated example of FIG. 2B, all options of options list 212 are displayed. In certain implementations, either because the quantity of options is too large or for any other suitable reason, the displayed portion could be less than all options of options list 212. In an example in which less than all options are displayed, selection box 210 could include a scroll bar or other suitable mechanism for traversing through the list, as well as being compatible with keyboard commands for traversing through options list 212.

In certain embodiments, in response to detecting activation of control 206 to transition multiselect component 146 from the closed state of FIG. 2A to the open state of FIG. 2B, and with no option from options list 212 selected, multiselect logic 119 may instruct display (e.g., by browser 130) of one or more of a selected quantity indicator (e.g., selected quantity indicator 216 and/or selected quantity indicator 224) that indicates that no option is selected; a quick action selection control for selecting all options (e.g., quick action selection control 218); and control 206 for transitioning multiselect component 146 from the open state of FIG. 2B to a closed state (e.g., of FIG. 2A or another figure, such as FIG. 2D depending on whether one or more options from options list 212 have been selected).

In certain embodiments, in response to detecting navigation to the selected quantity indicator (e.g., selected quantity indicator 216 and/or selected quantity indicator 224) in the open state of FIG. 2B, multiselect logic 119 may instruct playback by screen reader 132 of an announcement indicating that no option is selected. In certain embodiments, in response to detecting navigation to the quick action selection control for selecting all options (e.g., quick action selection control 218) in the open state, multiselect logic 119 may instruct playback by screen reader 132 of an announcement indicating the quick action selection control "Select All") for selecting all options from options list 212. For example, in response to detecting navigation to selected quantity indicator 216 of multiselect component 146, multiselect logic 119 may instruct playback by screen reader 132 of an announcement stating: "<x> of <total amount> selected," or "Zero of ten selected." As another example, in response to detecting navigation to quick action selection control 218 of multiselect component 146, multiselect logic 119 may instruct playback by screen reader 132 of an announcement stating: "<x> number of options selected. Select all?," or "Zero options selected. Select all?"

In certain embodiments, in response to detecting navigation to selection instruction 214 with multiselect component 146 in the open state, multiselect logic 119 may instruct playback by screen reader 132 of an announcement indicating the selection instruction. For example, in response to detecting navigation to selection instruction 214 with multiselect component 146 in the open state, multiselect logic 119 may instruct playback by screen reader 132 of an announcement stating: "<Help text> Select up to x," or "Select up to seven."

As illustrated in FIG. 2C, multiselect component 146 from FIG. 2B remains in an open state, and multiple options from options list 212 have been selected. In particular, the Banana and Strawberry options from options list 212 have been selected. Due to the selection of options from options list 212, certain other elements of multiselect component 146 have been updated. For example, selected quantity indicator 216 has been updated to read "2 of 10 selected," indicating that 2 of the 10 options from options list 212 have been selected, and selected quantity indicator 224 has been updated to read "2 selected," also indicating that 2 options have been selected. As another example, with at least one option from options list 212 selected, quick action selection control 218 has been changed from "Select All" to "Clear All," to provide a quick option to unselect all options from options list 212.

In certain embodiments, in response to selection of options from options list 212, selection instruction 214 may be adjusted, if appropriate. For example, because the original selection instruction 214 indicated that up to 7 options could be selected, and in the state illustrated in FIG. 2C two options have been selected, selection instruction 214 may be adjusted to indicate that up to 5 options can be selected. In other words, selection instruction 214 has been adjusted to indicate the number of remaining options that can be selected. In other implementations, selection instruction 214 may continue to indicate the total number of options that can be selected (e.g., seven) even though one or more options currently are selected.

Visually, the selection of options from options list 212 is indicated by adding a check (or other form of indicator) to the selection box adjacent the text that is part of the selected option (e.g., the selection box adjacent to Banana), and also shading or otherwise highlighting the box. Of course, the selection of an option from options list 212 could be indicated in any number of ways.

In certain embodiments, in response to detecting, with multiselect component 146 in an open state, navigation to a particular option in options list 212, multiselect logic 119 may instruct playback by screen reader 132 of an announcement indicating a name of the particular option, indicating whether the particular option is selected, and/or indicating selected quantity indicator 216 (e.g., X of a total amount selected). In other words, as a user navigates through options list 212, such as by deliberately changing focus from one option of options list 212 to another option in options list 212, multiselect logic 119 may instruct playback by screen reader 132 of an announcement indicating the text of the option (e.g., "Apple") and a selection status (e.g., "Unselected") of the option that is the current focus of the user in options list 212. This capability provides a screen reader user with greater control over the announcements associated with navigating through a list of available options of a multiselect component, lists which often can be quite long, saving the user time and creating a more efficient user experience. Furthermore, this capability saves system resources by avoiding unnecessary processing of lists of options when the user's focus is not on a particular option.

For example, in response to detecting, with multiselect component 146 in the open state, navigation to a particular option in options list 212, multiselect logic 119 may instruct playback by screen reader 132 of an announcement stating: "<Name of list item> selected/not selected (x of total amount)," with "Name of list item" being a name of the particular option, "selected/not selected" being the selection status of the particular option, and "x of total amount" being selected quantity indicator 216. As a particular example, if the particular option from options list 212 of FIG. 2C is Banana, multiselect logic 119 may instruct playback by screen reader 132 of an announcement stating: "Banana. Selected. Two of ten selected." As another particular example, if the particular option from options list 212 of FIG. 2C is Grape, multiselect logic 119 may instruct playback by screen reader 132 of an announcement stating: "Grape. Not selected. Two of ten selected."

In certain embodiments, in response to detecting, with multiselect component 146 in an open state, selection of a first option (e.g., Banana) of the first displayed portion of the plurality of options of options list 212, multiselect logic 119 may instruct playback by screen reader 132 of an announcement indicating a name (e.g., "Banana") of the first option, indicating that the first option has been selected (e.g., "Banana has been selected"), and/or indicating selected quantity indicator 216 (e.g., X of a total amount selected). To the extent included, the quantity indicated by the announcement associated with selected quantity indicator 216 may be an updated quantity (e.g., incremented by one) based on the selection of the first option.

In certain embodiments, multiselect logic 119 determines whether a selection limit has been reached. The selection limit could be, for example, the selection limit indicated by selection instruction 214, which could be any suitable amount. In response to detecting that the selection limit has been reached, multiselect logic 119 may instruct playback by screen reader 132 of an announcement indicating that the selection limit has been reached. Although not illustrated in this manner, assuming Raspberry is being selected as the seventh selected option (with seven being the selection limit), in response to detecting, in the open state, selection of an option (Raspberry) of the first displayed portion of the plurality of options of options list 212, and further in response to multiselect logic 119 determining that the selection limit has been reached, multiselect logic 119 may instruct playback by screen reader 132 of an announcement indicating a name (e.g., "Raspberry") of the selected option, indicating that the selected option has been selected (e.g., Selected), indicating selected quantity indicator 216 (e.g., "Seven of ten selected"), and indicating that the selection limit has been reached (e.g., "Selection limit reached"). Thus, the example announcement could read: "Raspberry. Selected. Seven of ten selected. Selection limit reached."

In certain embodiments, in response to detecting, with multiselect component 146 in an open state, deselection of an option of the displayed options, multiselect logic 119 may instruct playback by screen reader 132 of an announcement indicating a name of the deselected option, indicating that the deselected option has been deselected, and/or indicating selected quantity indicator 216 (e.g., X of a total amount selected). To the extent included, the quantity indicated by the announcement associated with selected quantity indicator 216 may be an updated quantity (e.g., decremented by one) based on the deselection of an option. Although in the illustrated example, no option has been deselected, in an example in which Banana has been deselected, multiselect logic 119 may instruct playback by screen reader 132 of an announcement indicating a name (e.g., "Banana") of the deselected option, indicating that the deselected option has been deselected (e.g., "Banana has been deselected"), and/or possibly indicating an updated selected quantity indicator 216 (e.g., "One of ten selected.").

In certain embodiments, certain options from options list 212 could be disabled, which may mean that those options are no available for selection. This could be because those options simply are not longer available for selection but are kept in options list 212 for some other reason, because the selection limit has been reached (e.g., meaning that no options in options list 212 are available for selection unless another selected option is deselected or the selection limit is increased), or for another reason. Disabled options may be displayed in a dimmed manner or in another way that reflects that those options are disabled. In certain embodiments, in response to detecting, with multiselect component 146 in the open state, navigation to a dimmed option in options list 212, multiselect logic 119 may instruct playback by screen reader 132 of an announcement indicating a name of the dimmed option, indicating whether the dimmed option is selected, indicating that the dimmed option is dimmed, and/or indicating selected quantity indicator 216 (e.g., X of a total amount selected). For example, in response to detecting, with multiselect component 146 in the open state, navigation to a dimmed option in options list 212, multiselect logic 119 may instruct playback by screen reader 132 of an announcement stating: "<Name of list item> selected/not selected dimmed (x of total amount)." As a particular example, although not shown in this manner, if the dimmed option from options list 212 of FIG. 2C is Rhubarb, multiselect logic 119 may instruct playback by screen reader 132 of an announcement stating: "Rhubarb. Not selected. Dimmed. Two of ten selected."

As illustrated in FIG. 2D, in response to selection of control 206 from FIG. 2C, multiselect component 146 has transitioned from an open state to a closed state. However, rather than returning to the closed state illustrated in FIG. 2A, because at least one option from options list 212 was selected (e.g., as shown in FIG. 2C), multiselect component 146 is shown in what may be termed a summary view 227.

In the illustrated example, summary view 227 could be considered a merged area formed from aspects of input field 202 and selection area 210. This is just one example of the manner in which the summary view could be visually presented.

Summary view 227 includes a selected options list 226 that includes the options from options list 212 that are currently selected by the user (e.g., as selected at the state illustrated in FIG. 2C). Visually, currently-selected options are shown with the text label (e.g., Banana) and the adjacent selection box, with the selection being indicated by a check (or other form of indicator) added to the selection box, and also shading or otherwise highlighting the box. Of course, the selection of an option from options list 212 could be indicated in any number of ways. The selection options of selected options list 226 may be listed in the order in which those options were included in options list 212, or in another suitable order (e.g., the order in which the selected options were selected).

In certain embodiments, summary view 227 includes a selected quantity indicator. In the illustrated example, the selected quantity indicator is in the form of selected quantity indicator 216, but the selected quantity indicator could be in the form of selected quantity indicator 224 or another suitable form. In certain embodiments, summary view 227 includes control 206. With multiselect component 146 in the closed state for summary view 227, control 206 has changed to indicate that multiselect component 146 can be opened by selecting control 206, and selection of control 206 causes multiselect component 146 to transition from a closed state to an opened state. In this particular example, control 206 with multiselect component 146 in the closed state is shown as a downward arrow, or chevron.

In certain embodiments, in response to detecting activation of control 206 to transition multiselect component 146 from the open state of FIG. 2C to the closed state of FIG. 2D, and with at least one option from options list 212 currently selected, multiselect logic 119 may instruct browser 130 to display, with multiselect component 146 in the closed state, summary view 227 that includes a selected options list 226. Selected options list 226 may include at least a subset of the one or more selected options from options list 212. In the illustrated example, the subset displayed in selected options list 226 includes all of the selected options from options list 212 (e.g., both Banana and Strawberry). As described in greater detail below with reference to FIG. 2G, in certain embodiments, the subset of selected options displayed in selected options list 226 may include less than all of the selected options from options list 212.

In certain embodiments, in response to detecting activation of control 206 to transition multiselect component 146 from the open state of FIG. 2C to the closed state of FIG. 2D, and with at least one option from options list 212 currently selected, multiselect logic 119 may instruct playback by screen reader 132 of an announcement indicating that multiselect component 146 is in the closed state. As just one example, in response to detecting activation of control 206 to transition multiselect component 146 from the open state of FIG. 2C to the closed state of FIG. 2D, and with at least one option from options list 212 currently selected, multiselect logic 119 may instruct playback by screen reader 132 of an announcement stating: "<Name><x number> selected. Select listbox popup collapsed," or "Fruits. Two selected. Select listbox popup collapsed."

In certain embodiments, in response to detecting navigation to summary view 227, multiselect logic 119 may instruct playback by screen reader 132 of an announcement indicating navigation to summary view 227 that includes selected options list 226. In certain embodiments, in response to detecting navigation to a particular selected option (e.g., Banana) of the one or more selected options in selected options list 226, multiselect logic 119 may instruct playback by screen reader 132 of an announcement indicating a name (e.g., "Banana") of the particular selected option, indicating that the particular selected option is selected (e.g., "Selected"), and/or indicating a selected quantity indicator (e.g., "One of ten selected."). For example, in response to detecting navigation to a top-most selected option in selected options list 226 of summary view 227, multiselect logic 119 may instruct playback by screen reader 132 of an announcement stating: "Entering selected listbox. <Name of the list item>. Selected. (x of total amount)." In the illustrated example, in response to detecting navigation to Banana in selected options list 226 of summary view 227, multiselect logic 119 may instruct playback by screen reader 132 of an announcement stating: "Entering selected listbox. Banana. Selected. Two of ten selected." If the selected list item to which navigation is detected is not the top-most list item, the announcement indicating that navigation has entered summary view 227 (e.g., "Entering selected listbox") might be omitted.

As illustrated in FIG. 2E, in response to selection of control 206, multiselect component 146 has transitioned from a closed state to an open state, again revealing selection area 210. In particular, in response to selection of control 206, multiselect component 146 has transitioned from summary view 227 of the closed state shown in FIG. 2D to the open state shown in FIG. 2E.

In general, the state of multiselect component 146 in FIG. 2E is similar to the state of multiselect component 146 in FIG. 2C. Thus, many aspects of the state illustrated in FIG. 2E are not repeated. In FIG. 2E, however, the currently-selected options from options list 212 have been moved to the top of options list 212. In particular, in FIG. 2E, the two selected options, Banana and Strawberry, have been moved to the top of options list 212.

In certain embodiments, in response to detecting activation of control 206 to transition multiselect component 146 from the closed state (e.g., of FIG. 2D) to the open state (e.g., of FIG. 2E), and with at least one option of the multiple options from options list 212 selected, multiselect logic 119 may instruct display (e.g., by browser 130) of selected quantity indicator (e.g., selected quantity indicator 216) that indicates a quantity of selected options and a total quantity of options (e.g., "2 of 10 selected"), a quick action selection control for deselecting all options (e.g., quick action selection option 218, which reads "Clear All"), and a control 206 for transitioning multiselect component 146 from the open state (e.g., of FIG. 2E) to a closed state. In certain embodiments, in response to detecting navigation to selected quantity indicator 216 in the open state (e.g., of FIG. 2E), multiselect logic 119 may instruct playback by screen reader 132 of an announcement indicating the quantity of selected options and a total quantity of options (e.g., "2 of 10 selected"). In certain embodiments, in response to detecting navigation to quick action selection control (e.g., quick action selection option 218) in the open state (e.g., of FIG. 2E), multiselect logic 119 may instruct playback by screen reader 132 of an announcement indicating the quick action selection control ("Clear All") for deselecting all options of options list 212.

As described above, in certain embodiments, and as illustrated in FIG. 2E, the currently-selected options of options list 212 have been moved to the top of options list 212. Moving the currently-selected options to the top of options list 212 may provide certain technical advantages, such as allowing users of screen reader 132 to more efficiently access information about the selected options relative to navigating through options list 212 to find selected options if the selected options were not sorted to the top of options list 212.

As illustrated in FIG. 2F, multiselect component 146 remains in an open state (e.g., from FIG. 2E), and additional options from options list 212 have been a selected. In particular, in addition to the two options already selected from options list 212 (e.g., Banana and Strawberry), four additional options from options list 212 (e.g., Orange, Melon, Mango, and Raspberry) are currently selected.

Due to the selection of additional options from options list 212, certain other elements of multiselect component 146 have been updated. For example, selected quantity indicator 216 has been updated to read "6 of 10 selected," indicating that 6 of the 10 options from options list 212 have been selected, and selected quantity indicator 224 has been updated to read "6 selected," also indicating that 6 options have been selected. As another example, and though not a modification from FIG. 2E, with at least one option from options list 212 selected, quick action selection control 218 continues to read "Clear All," to provide a quick option to unselect all options from options list 212.

In certain embodiments, in response to selection of additional options from options list 212, selection instruction 214 may be adjusted, if appropriate. For example, because the original selection instruction 214 indicated that up to 7 options could be selected, and in the state illustrated in FIG. 2F six options have been selected, selection instruction 214 may be adjusted to indicate that up to 1 option can be selected. In other words, selection instruction 214 has been adjusted to indicate the number of remaining options that can be selected. Other implementations are possible, as described above with reference to FIG. 2C.

Visually, the selection of options from options list 212 is indicated by adding a check (or other form of indicator) to the selection box adjacent the text that is part of the selected option (e.g., the box adjacent Orange), and also shading or otherwise highlighting the box. Of course, the selection of an option from options list 212 could be indicated in any number of ways.

In this example, the previously selected options (e.g., Banana and Strawberry) remain at the top of options list 212, and the newly-selected options remain in their respective positions in options list 212. In certain embodiments, if multiselect component 146 were closed and reopened, the newly-selected options (e.g., Orange, Melon, Mango, and Raspberry) also may be moved to the top of options list 212, along with the previously-selected options (e.g., Banana and Strawberry), assuming none have been deselected. The particular order of the currently-selected options at the top of options list 212 can vary, but in certain embodiments, the newly-selected options would be moved under the previously-selected options, but otherwise retain their relative positions within options list 212 (e.g., Banana, Strawberry, Orange, Melon, Mango, and Raspberry), with the remaining unselected options from options list 212 retaining their relative position in options list 212 (e.g., Apple, Grape, Kiwi, and Rhubarb). Additionally or alternatively, in certain embodiments, the previously-selected options and the newly-selected options could be restored to their original relative positions (e.g., from options list 212 at the state shown in FIG. 2B) (e.g., Orange, Banana, Melon, Strawberry, Mango, and Raspberry), with the remaining unselected options from options list 212 retaining their relative position in options list 212 (e.g., Apple, Grape, Kiwi, and Rhubarb).

Figure 2H:
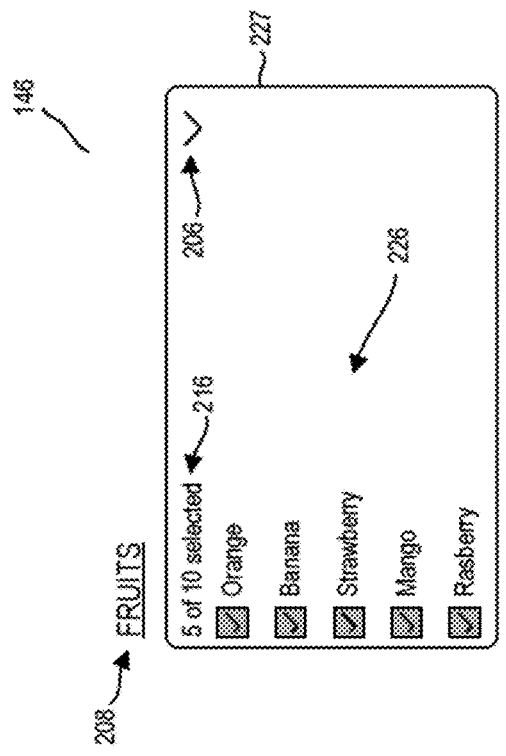
Figure 2G:
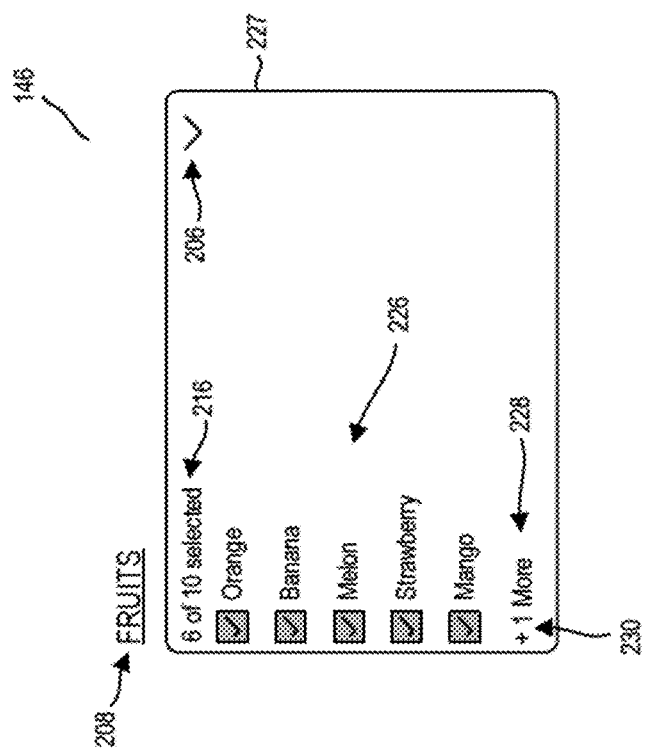

As illustrated in FIG. 2G, in response to selection of control 206 from FIG. 2F, multiselect component 146 has transitioned from an open state to a closed state. As with FIG. 2D, rather than returning to the closed state illustrated in FIG. 2A, because at least one option from options list 212 was selected (e.g., as shown in FIG. 2F), multiselect component 146 is shown in summary view 227. Because summary view 227 of FIG. 2G shares many features in common with summary view 227 illustrated in and described with reference to FIG. 2D, certain features are not repeated to describe summary view 227 of FIG. 2G.

Summary view 227 of FIG. 2G includes at least a portion of the currently-selected options from options list 212. In particular, in FIG. 2G, summary view 227 has been updated to include at least some of the newly-selected options from FIG. 2F. The particular order of the currently-selected options in summary view 227 can vary, but in certain embodiments (and in the illustrated example of FIG. 2G), the previously-selected options and the newly-selected options could be restored to their original relative positions (e.g., from options list 212 at the state shown in FIG. 2B) (e.g., Orange, Banana, Melon, Strawberry, Mango, and Raspberry, with Raspberry not being shown for reasons described below) in summary view 227.

In certain embodiments, it may be desirable to limit a size of summary view 227, such as by limiting a number of selected options that are displayed in selected options list 226 of summary view 227. To that end, a threshold number of selected options that may be displayed in selected options list 226 of summary view 227 may be defined. In the illustrated example, the threshold is defined as 5, such that only 5 selected options from options list 212 are displayed in selected options list 226. Of course, the threshold may be set to any suitable value, or may be omitted if desired. If a threshold is defined and the number of selected options exceeds the threshold, then the number of selected options may be limited by the threshold and a number of selected options exceeding the threshold may be indicated in selected options list 226 of summary view 227 using an excess quantity indicator 228.

Summary view 227 may include an expander control 230 that may be used to view the additional selected options. In certain embodiments, some or all of the excess quantity indicator 228 also may act as expander control 230. For example, some or all of the text of excess quantity indicator 228 (e.g., "+1 More") may be implemented as a selectable control, selection of which causes the additional selected options to become viewable, such that excess quantity indicator 228 also operates as expander control 230. Additionally or alternatively, summary view 227 may include an expander control that is separate from excess quantity indicator 228.

In certain embodiments, in response to detecting that a quantity of the one or more selected options in selected options list 226 exceeds a threshold, multiselect logic 119 may instruct browser 130 to display, in the closed state, summary view 227 to include less than all of the one or more selected options of the selected options list 226 and an excess quantity indicator 228 indicating that additional selected options of the one or more selected options of selected options list 226 are available by selecting an expander control 230. In certain embodiments, in response to detecting navigation to excess quantity indicator 228, multiselect logic 119 may instruct playback by screen reader 132 of an announcement indicating a quantity of additional selected options of the one or more selected options that are available to be viewed. As just one example, in response to detecting navigation to excess quantity indicator 228/expander control 230, multiselect logic 119 may instruct playback by screen reader 132 of an announcement stating: "+<x number> more button," or, in the illustrated example, "Plus 1 more button."

In certain embodiments, in response to detecting activation of expander control 230, multiselect logic 119 may instruct transitioning of multiselect component 146 from the closed state (e.g., of FIG. 2G) to an open state such that a second displayed portion of the options are displayed in the open state. The one or more selected options may be sorted to a top of the second displayed portion. In certain embodiments, assuming no changes were made to the selected options while in summary view 227 of FIG. 2G, in response to detecting activation of expander control 230, multiselect logic 119 may instruct transitioning of multiselect component 146 from the closed state of FIG. 2G to the open state of FIG. 2F, but with the order of options list 212 resorted such that the selected options appear at the top of options list 212. An example order may include displaying the selected options at the top of options list 212 in the order Orange, Banana, Melon, Strawberry, Mango, and Raspberry, followed by the unselected options in the order Apple, Grape, Kiwi, and Rhubarb.

In certain embodiments, although not illustrated in this manner, one or more options prior to excess quantity indicator 228 may be dimmed. The dimmed options could include a first set of one or more options that exceed the threshold or could be the last set of one or more options prior to exceeding the threshold. To the extent dimmed options are included, in certain embodiments, in response to detecting navigation to one of the dimmed options of selected options list 226 of summary view 227, multiselect logic 119 may instruct playback by screen reader 132 of an announcement indicating that the quantity of options displayable in summary view 227 has been reached. For example, the announcement could indicate: "<Name of the list item> Max limit reached. Selected Dimmed (x of total selected)." Although not illustrated in this manner, assuming Mango was dimmed, in response to detecting navigation to Mango, multiselect logic 119 may instruct playback by screen reader 132 of an announcement stating: "Mango. Max limit reached. Selected. Dimmed. Six of ten selected."

As illustrated in FIG. 2H, multiselect component 146 from FIG. 2G remains in the closed state, with summary view 227 being displayed and multiple options from options list 212 currently selected, at least a portion of which are shown in summary view 227 as selected options list 226. As illustrated in FIG. 2H, selected options in selected options list 226 may be deselected directly from summary view 227, providing a convenient and efficient mechanism for deselecting selected options without the extra steps of expanding to the full options list 212 for deselection. In this particular example, Melon has been deselected.

Additionally, because the deselection of a selected option (e.g., Melon) reduced the number of selected options in selected options list 226 to being at (or below, depending on the implementation of the threshold comparison) the threshold, selected options list 226 now lists all selected options, with Raspberry being added to selected options list 226 and excess quantity indicator 228 and expander control 230 being removed from summary view 227. In a scenario in which a selected option is deselected but the remaining quantity of selected options still exceeds (or meets, depending on the implementation of the threshold comparison) the threshold, then a number of selected options equivalent to the number of deselected options may be added to selected options list 226, with excess quantity indicator 228 (modified to show an appropriate quantity) and expander control 230 continuing to be displayed in summary view 227. The selected options added to selected options list 226 may be the next in the order if multiselect component 146 were opened to show full options list 212.

In certain embodiments, in response to detecting, in the closed state with summary view 227 displayed, deselection of a first selected option of the one or more selected options, multiselect logic 119 may instruct playback by screen reader 132 of an announcement indicating a name of the first selected option (e.g., Melon) and indicating that the first selected option has been deselected (e.g., "Mango has been deselected.").

FIGS. 3A-3E illustrate a set of user interface screens having a multiselect component 146 at various stages of interaction, according to certain embodiments. In particular, FIGS. 3A-3E illustrate certain features in associate with a search functionality of multiselect component 146, according to certain embodiments. In conjunction with certain of FIGS. 3A-3E, one or more announcement are described as being initiated by multiselect logic 119.

Figures 3A, 3B:
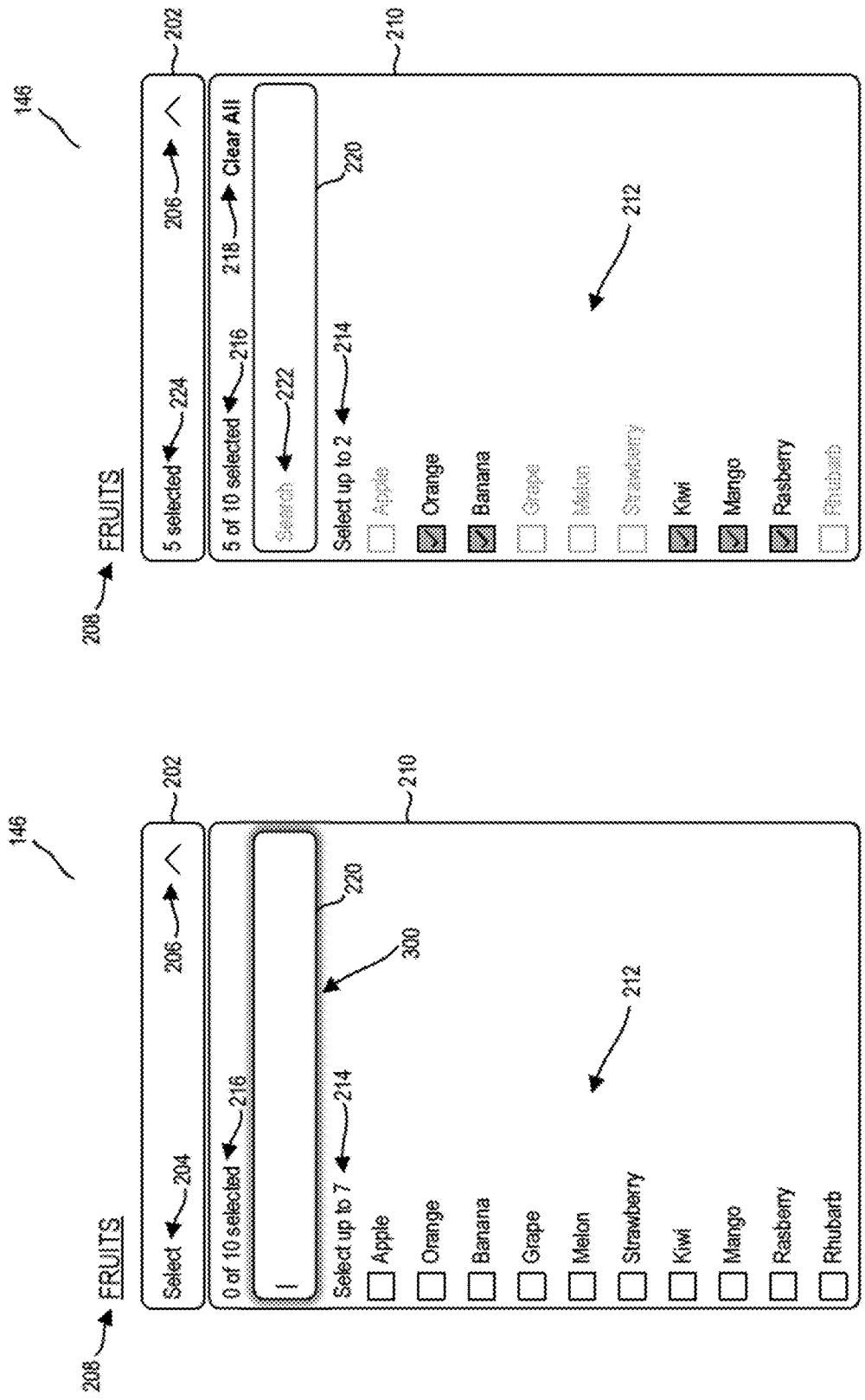

As illustrated in FIG. 3A, in response to selection of control 206, multiselect component 146 has transitioned from a closed state to an open state, revealing selection area 210. In general, FIG. 3A may correspond to a state of multiselect component 146 as shown in FIG. 2B. In FIG. 3A, however, the user has navigated to search field 220, as shown by the presence of the cursor in search field 220, as well as a glowing border 300 around search field 220. In other words, the current focus is on search field 220. In certain embodiments, glowing border 300 may be a different color than other aspects of search field 220 (and potentially other aspects of multiselect component 146), so that the current focus is easily identifiable visually. Additionally, in certain embodiments, with the cursor in search field 220, search indicator 222 has been removed. As described above, in certain embodiments, search field 220 may be used to search options list 212 for options matching the search parameters entered into search field 220.

In certain embodiments, in response to detecting activation of control 206 to transition multiselect component 146 from the closed state (e.g., similar to the closed state of FIG. 2A) to the open state of FIG. 3A, multiselect logic 119 may instruct display (e.g., by browser 130), in the open state, of search field 220 for searching the options in options list 212. In certain embodiments, in response to detecting navigation to search field 220, multiselect logic 119 may instruct playback by screen reader 132 of an announcement that searching is available. For example, in response to detecting navigation to search field 220 of multiselect component 146, multiselect logic 119 may instruct playback by screen reader 132 of an announcement stating: "Search to filter options. <Placeholder text> text field," or "Search to filter options. Text field."

As illustrated in FIG. 3B, multiselect component 146 from FIG. 3A remains in the open state, the user has navigated away from search field 220, and multiple options from options list 212 have been selected. In particular, five options (Orange, Banana, Kiwi, Mango, and Raspberry) have been selected from options list 212. Due to the selection of options from options list 212, certain other elements of multiselect component 146 have been updated in a manner analogous to that described above with reference to FIGS. 2C and 2F, and those details are not repeated. Additionally, in the example illustrated in FIG. 3B, unselected options (e.g., Apple, Grape, Melon, Strawberry, and Rhubarb) are shown in a dimmed manner relative to selected options (e.g., Orange, Banana, Kiwi, Mango, and Raspberry) in options list 212.

As illustrated in FIG. 3C, with multiselect component 146 in the open state, navigation has returned to search field 220 and search input has been received. In particular, the search character "a" has been input into search field 220. Searching according to the search input may include searching all options in options list 212, searching only the selected options in option list 212, or searching other suitable content. Searching according to the search input may include searching for exact matches, searching for matches that contain the search input, or searching in any other suitable manner. The search might or might not be case sensitive. In the illustrated example, all options in options list 212 are searched according to the current search input, that is to identify text that contains the letter "a." In certain embodiments, the matching characters within the text portion of searched options in options list 212 are bolded. For example, an "a" in each option that includes a letter "a" is bolded (e.g., all options other than Melon and Kiwi in options list 212 in the illustrated example). In certain embodiments, non-matching options are removed from options list 212, such that options list 212 becomes matching options list 302.

In certain embodiments, in response to a search input, multiselect logic 119 may instruct playback by screen reader 132 of the text input for the search input. As one particular example, multiselect logic 119 may instruct playback by screen reader 132 of each character of the search input one-by-one as the characters are entered. In certain embodiments, while focus remains on search field 220 and in response to detecting a pause in inputting of search input, multiselect logic 119 may instruct playback by screen reader 132 of all existing text input for the search input (e.g., the entire current text string of the search input).

In certain embodiments, in response to a search input, multiselect logic 119 may search the options of options list 212 according to the search input. In certain embodiments, the searching is performed, the matching characters are identified, and options list 212 is modified into matching options list 302 as search input is entered into search field 220, without waiting for the user to input a search execution command (e.g., an "Enter," "Return," or other suitable command) or otherwise navigate away from search field 220.

As illustrated in FIG. 3D, with multiselect component 146 in the open state, the content of multiselect component 146 is generally the same as in FIG. 3D, except that navigation (e.g., focus) has moved from the search field. This could occur, for example, in response to a user inputting a search execution command (e.g., an "Enter," "Return," or other suitable command). In the illustrated example, because navigation has moved away from search field 220, glowing border 300 around search field 220 has been removed. In certain embodiments, in response to a user inputting an "Enter" or "Return" (or other suitable) command, navigation (focus) automatically moves to the first matching option in matching options list 302, which may facilitate quickly reviewing the matching options that have been identified in response to the search input.

In certain embodiments, in response a search execution command and in a state in which at least one matching option is identified according to a search input, multiselect logic 119 may instruct navigation by browser 130 to a first matching option of the at least one matching option in matching options list 302, and may instruct playback by screen reader 132 of an announcement indicating one or more of a name of the first matching option in matching options list 302, an indication of whether the first matching option is selected, and an indication of a total number of matching options, potentially with an indication of where the first matching option falls within the list of matching options. For example, the announcement could indicate: "<Name of the list item> selected/not selected (<y> of <x>)," with x being the total number of matching search results and y being the position of this particular result in the matching search results (e.g., 1 in this case). In the illustrated example, the playback could be: "Mango. Not Selected. One of eight." If the user navigates to the next item in matching options list 302, the playback could be: "Orange. Selected. Two of eight." Multiselect logic 119 may automatically traverse through the matching options list 302, instructing screen reader 132 to play back these announcements as focus shifts from one matching option to the next in matching options list 302, or may wait for suitable input from a user before traversing from matching option to matching option in matching options list 302.

Figure 3E:
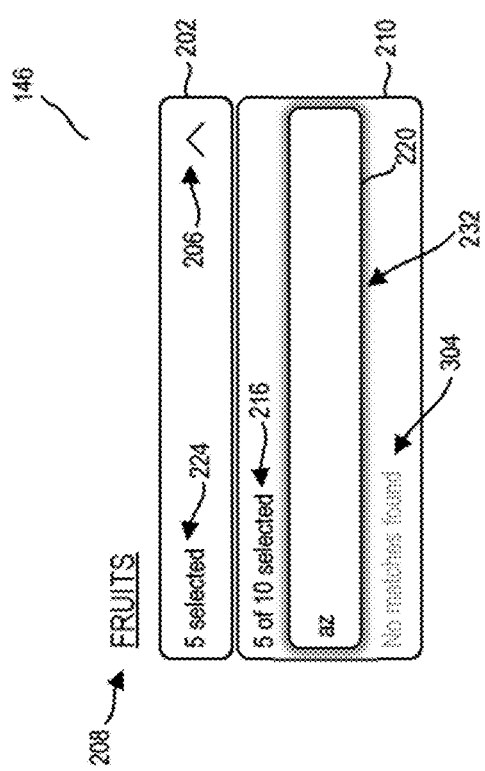

As illustrated in FIG. 3E, with multiselect component 146 in the open state, navigation has returned to search field 220 and additional search input has been received. Because focus has returned to search field 220, according to the illustrated example, multiselect logic 119 again instructs browser 130 to display glowing border 232 around search field 220. Of course, the additional search input could be received in the state illustrated in FIG. 3C, without moving to the state illustrated in FIG. 3D.

Continuing with FIG. 3E, the additional search input in this example is adding a "z" such that the search input now is the character combination "az" for which no matches are identified. To search for matches, multiselect logic 119 may search options list 212, matching options list 302, or another suitable source. In certain embodiments, based on no matches being identified, multiselect component 146 includes a no-match indicator 304. In this example, no-match indicator 304 reads "No matches found," though of course this disclosure contemplates using any suitable indicator to convey that no matches are found.

In certain embodiments, in response to a search input, multiselect logic 119 may search options (e.g., options list 212 and/or matching options list 302) according to the search input. In certain embodiments, in response to a search input for which no match is identified, and while navigation remains at search field 220, and prior to detecting additional input multiselect logic 119 may instruct display (e.g., by browser 130) of no-match indicator 304 and playback by screen reader 132 of an announcement indicating that no match is found. For example, without waiting for additional input, such as further search input or a search execution command, and while focus remains at search field 220, multiselect logic 119 may instruct display (e.g., by browser 130) of no-match indicator 304 and playback by screen reader 132 of an announcement indicating that no match is found. In a particular example, the announcement could read, "No matches found." This feature may provide a screen reader user with substantially immediate feedback that no match has been found based on the latest search character without the screen reader user navigating away from search field 220.

The features of multiselect component 146 described above with reference to FIGS. 2A-2H and FIGS. 3A-3E are provided as examples only.

For example, in the illustrated examples of FIGS. 2A-2H and 3A-3E, multiselect component 146 includes an options list 212 and a selected options list 226 that includes one or more selectable options arranged in a vertical list, with each selectable option including a selection box and associated text positioned adjacent to the selection box. This disclosure, however, contemplates any suitable format for implementing options list 212 and selected options list 226, including horizontal lists, or lists in other formats. Additionally or alternatively, although multiselect component 146 is illustrated and described as being implemented using a so-called drop-down menu, this disclosure contemplates implementing multiselect component 146 in any other suitable manner, such as for revealing (e.g., opening) and hiding (e.g., closing) options list 212.

As another example, the manner of making and indicating selections of options from options list 212 and in selected options list 226 may be implemented in different ways than those shown and described. Although options list 212 and selected options list 226 include certain numbers of selectable options and selected options, respectively, multiselect component 146 may include any number of selectable or selected options. Furthermore, the particular options that have been selected, deselected, or otherwise acted upon/not acted upon are merely used as examples; any options or combinations of options could be selected, deselected, or otherwise acted up/not acted upon.

As another example, the particular text, including the particular options, headers, labels, indicators, announcements, and the like, are shown merely to ease description of multiselect component 146. This disclosure contemplates implementing multiselect component 146 using any suitable text, including any suitable options, headers, labels, indicators, announcements, and the like. Furthermore, the presence, location, and orientation of the text may be implemented in any suitable manner. For example, multiselect component 146 may be used for selection of any suitable types of options. As another example, the particular phrasing of selected quantity indicators (e.g., "0 selected", "2 selected of 10", "6 selected of 10", "5 selected of 10", and "5 selected," or the like) could be implemented in any suitable manner, if included at all. Of course, the content of such selected quantity indicators may vary depending on which selectable options have been selected and the total number of selectable options included in multiselect component 146.

In FIGS. 2C-2H and 3B-3D, certain ones of the selection boxes-specifically boxes that have been selected-contain shading. This shading indicates that the boxes with the shading contain shading and/or color that differs from a shading or color of the remaining unselected selection boxes of multiselect component 146. To the extent shading is used to indicate selection, the particular shading style and color may vary for different implementations.

Returning to FIG. 1, in certain embodiments, multiselect logic 119 is compatible with keyboard interaction. Table 1 below provides just one example of how the keyboard interaction could be implemented. These particular keyboard interactions are provided as examples only.

TABLE 1

| Keystroke(s) | Interaction |
| --- | --- |
| Tab | Moves forward into and out of the multiselect component (e.g., multiselect component 146). |
| Shift + Tab | Moves backward to the previous interactive element. |
| Spacebar or Enter or ↑ and ↓ | Opens options list (e.g., options list 212) from which to choose one or more options. |
| ↑ and ↓ | Moves between the previous or next options in the options list (e.g., options list 212 or selected options list 226). |
| Spacebar or Enter | Selects the focused option or unselects the focused option if previously selected. |

These keyboard interactions could be input through keyboard 134, for example. Additionally or alternatively, navigation through and/or interaction with multiselect component 146 could be implemented using voice input, received through microphone 136.

In operation of an example of system 100, including certain features performed by server system 102, server system 102 (e.g., logic 117) receives, from client 106, web request 148 for web content 118. For example, web request 148 may be a hypertext transfer protocol (HTTP) request, an HTTP secure (HTTPS) request, or other suitable type of request. The requested web content 118 may be a web page, web application, or other suitable type of web content.

Server system 102 (logic 117) may identify, in response to web request 148, web content 118 that is responsive to web request 148 (e.g., using any suitable lookup mechanism). In the illustrated example of FIG. 1, the web content 118 that is identified by server system 102 is web content 118a, which may be a web page, web application, or other suitable type of web content. For purposes of this example, it will be assumed that the web content 118a identified by server system 102 includes multiselect logic 119 for generating a multiselect component 146 that has features according to certain embodiments of this disclosure.

Server system 102 (logic 117) may transmit, to client 106 in response to web request 148, web content 118. That is, server system 102 may transmit the identified web content 118 to client 106 as response 150. In the illustrated example of FIG. 1, the web content 118 that is identified by server system 102 and transmitted to client 106 is web content 118a, which may be a web page, web application, or other suitable type of web content. For purposes of this example, it will be assumed that the web content 118a transmitted to client device 106 includes multiselect logic 119 for generating a multiselect component 146 that has features according to certain embodiments of this disclosure.

In operation of an example of system 100, including certain features performed by client device 106, multiselect logic 119 may instruct display (e.g., by browser 130) of a user interface that includes multiselect component 146. Multiselect component 146 may provide an ability to select multiple options from a displayable options list 212 that includes multiple options. Multiselect component 146 may have an open state and a closed state, with options list 212 being displayed in the open state. Initially, multiselect component 146 may be in a closed state in which options list 212 is not displayed.

In response to detecting navigation, in the closed state and with no options from options list 212 selected, to input field 202 of multiselect component 146, multiselect logic 119 may instruct: display (e.g., by browser 130) of indicator 204 in input field 202 that multiselect component 146 is available for inputting selections; display (e.g., by browser 130) of control 206 in input field 202 for transitioning, in response to activation of control 206, multiselect component 146 from the closed state to the open state; and playback by screen reader 132 of an announcement indicating label 208 for multiselect component 146 and an availability of activating control 206 in input field 202 for transitioning multiselect component 146 from the closed state to the open state. As just one example, in response to detecting navigation to input field 202 of multiselect component 146, multiselect logic 119 may instruct playback by screen reader 132 of an announcement stating: "<Name><x number> selected. Select listbox popup collapsed."

In response to detecting activation of control 206 to transition multiselect component 146 from the closed state to the open state, and with no option of the plurality of options of options list 212 selected, multiselect logic 119 may instruct display (e.g., by browser 130) of: selected quantity indicator 216 and/or selected quantity indicator 224 that indicates that no option is selected; quick action selection control 218 for selecting all options; and control 206 for transitioning multiselect component 146 from the open state to the closed state.

In response to detecting navigation to selected quantity indicator 216/224 with multiselect component 146 in the open state, multiselect logic 119 may instruct playback by screen reader 132 of an announcement indicating that no option is selected.

In response to detecting navigation to quick action selection control 218 with multiselect component 146 in the open state, multiselect logic 119 may instruct playback by screen reader 132 of an announcement indicating quick action selection control 218 for selecting all options.

Multiselect logic 119 may detect activation of control 206 to transition multiselect component 146 from the closed state to the open state. A first displayed portion of the options of options list 212 are displayed when multiselect component 146 is in the open state. For example, multiselect logic 119 instruct, in response to detecting activation of control 206 to transition multiselect component 146 from the closed state to the open state, display (e.g., by browser 130) of the first displayed portion of the options of options list 212 (e.g., in selection area 210) and playback by screen reader 132 of an announcement indicating that multiselect component 146 is in the open state.

The first displayed portion could be all options of options list 212 (e.g., all selectable options of multiselect component 146) or could be less than all options of options list 212. Whether the first displayed portion includes some or all of the options of options list 212 may depend on any suitable factors, but such factors could include a quantity of options in options list and how many can reasonably be displayed in a visually appealing and functional manner.

In response to detecting, with multiselect component 146 in the open state, navigation to a particular option in options list 212, multiselect logic 119 may instruct playback by screen reader 132 of an announcement indicating a name of the particular option and indicating whether the particular option is selected. Thus, in certain embodiments, the trigger for announcing names and selections statuses of options in options list 212 may be navigation to those particular options in options list, which may provide increased control to users of screen reader 132 over when announcements are made in relation to options in options list 212.

In response to detecting, with multiselect component 146 in the open state, selection of a first option of the first displayed portion of the options in options list 212, multiselect logic 119 may instruct playback by screen reader 132 of an announcement indicating a name of the first option and indicating that the first option has been selected.

Assuming that one or more options from options list 212 are currently selected (e.g., are selected options), in response to detecting activation of control 206 to transition multiselect component 146 from the open state to the closed state, and with at least one option of the plurality of options selected, multiselect logic 119 may instruct: display (e.g., by browser 130), with multiselect component 146 in the closed state, of summary view 227 that includes selected options list 226 having at least a subset of the one or more selected options; and playback by screen reader 132 of an announcement indicating that multiselect component 146 is in the closed state. In response to detecting navigation to summary view 227, multiselect logic 119 may instruct playback by screen reader 132 of an announcement indicating navigation to summary view 227 that includes selected options list 226. In response to detecting navigation to a particular selected option of the one or more selected options in selected options list 226, multiselect logic 119 may instruct playback by screen reader 132 of an announcement indicating a name of the particular selected option.

This disclosure describes additional details of example embodiments related to summary view 227 in greater detail below with reference to FIG. 7, as well as elsewhere in this disclosure.

In response to detecting activation of control 206 to transition multiselect component 146 from the closed state to the open state, and with at least one option of the plurality of options of options list 212 selected, multiselect logic 119 may instruct display (e.g., by browser 130) of: selected quantity indicator 216 that indicates a quantity of selected options and a total quantity of options in options list 212; quick action selection control 218 for deselecting all options (e.g., deselecting all currently selected options); and control 206 for transitioning multiselect component 146 from the open state to the closed state.

In response to detecting navigation to selected quantity indicator 216 with multiselect component 146 in the open state, multiselect logic 119 may instruct playback by screen reader 132 of an announcement indicating the quantity of selected options and a total quantity of options of option list 212.

In response to detecting navigation to quick action selection control 218 with multiselect component 146 in the open state, multiselect logic 119 may instruct playback by screen reader 132 of an announcement indicating quick action selection control 218 for deselecting all options (e.g., deselecting all currently selected options).

In response to detecting, with multiselect component 146 in the open state, deselection of a second option of the displayed options of options list 212, multiselect logic 119 may instruct playback by screen reader 132 of an announcement indicating a name of the second option (the deselected option) and indicating that the second option (the deselected option) has been deselected.

In operation of an example of system 100, including certain features performed by client device 106 in association with summary view 227, it will be assumed that multiselect component 146 is in the open state and that one or more options from options from options list 212 are currently selected. Multiselect logic 119 may detect activation of control 206 to transition multiselect component 146 from an open state to a closed state, and with at least one option of options list 212 selected. In other words, the options of options list 212 may include one or more selected options, and the one or more selected options of options list may be currently selected.

Multiselect logic 119 may determine whether a quantity of selected options from options list 212 exceeds a threshold number of selected options that may be displayed in selected options list 226 of summary view 227. The threshold may be set to any suitable value, or may be omitted if desired. Although described as exceeding (or not exceeding) the threshold, a case of matching the threshold could be treated as exceeding or not exceeding the threshold, according to particular implementations.

If multiselect logic 119 determines that the quantity of selected options from options list 212 does not exceed the threshold, then multiselect logic 119 may instruct display (e.g., by browser 130), with multiselect component 146 in the closed state, of summary view 227 that includes selected options list 226. Selected options list 226 may include at least a subset of the one or more selected options. In this example, because multiselect logic 119 determines that the quantity of selected options from options list 212 does not exceed the threshold, selected options list 226 may include all of the one or more selected options. Multiselect logic 119 may instruct playback by screen reader 132 of an announcement indicating that multiselect component 146 is in the closed state.

In response to detecting navigation to summary view 227, multiselect logic 119 may instruct playback by screen reader 132 of an announcement indicating navigation to summary view 227. In response to detecting navigation to a particular selected option of the one or more selected options in selected options list 226, multiselect logic 119 may instruct playback by screen reader 132 of an announcement indicating a name of the particular selected option.

In response to detecting, with multiselect component 146 in the closed state and with summary view 227 displayed, deselection of a first selected option of the one or more selected options (e.g., in selected options list 226), multiselect logic 119 may instruct playback by screen reader 132 of an announcement indicating a name of the first selected option (the deselected option) and indicating that the first selected option (the deselected option) has been deselected.

If multiselect logic 119 instead determines that the quantity of selected options from options list 212 exceeds the threshold, then multiselect logic 119 may instruct display (e.g., by browser 130), with multiselect component 146 in the closed state, of summary view 227 that includes selected options list 226. Selected options list 226 may include at least a subset of the one or more selected options. In this example, because multiselect logic 119 determines that the quantity of selected options from options list 212 exceeds the threshold, selected options list 226 may include less than all of the selected options. Additionally, in this example, multiselect logic 229 may instruct that summary view 227 include excess quantity indicator 228 indicating that additional selected options of the one or more selected options of the selected options list are available by selecting an expander control 230.

Interaction with summary view 227 that includes excess quantity indicator 228/expander control 230 may be generally the same as interaction with summary view that includes fewer selected options that the threshold, as described previously. That is, although selected options list 226 of summary view 227 includes less than all of the selected options when the quantity of selected options exceeds a threshold, interaction with summary view 227 (and particularly with those selected options that are displayed) may be similar to when all selected options are displayed.

Additionally, in certain embodiments, deselection form a summary view 227 that includes less than all of the selected options in selected options list 226 may be possible in a similar manner. Furthermore, as described above with reference to FIG. 2H, deselecting a selected option in such a scenario may alter which selected options are displayed in selected options list 226 of summary view 227, as such deselection may result in another previously-undisplayed selected option being displayed in summary view 227 (if a quantity of selected options still exceeds the threshold following the deselection) or in all selected options being displayed in summary view 227 (if a quantity of selected options no longer exceeds the threshold following the deselection).

In response to detecting navigation to excess quantity indicator 228, multiselect logic 119 may instruct playback by screen reader 132 of an announcement indicating a quantity of additional selected options of the one or more selected options that are available to be viewed.

In response to detecting activation of expander control 230, multiselect logic 119 may transition multiselect component 146 from the closed state to the open state such that a second displayed portion of the plurality of options are displayed in the open state, the one or more selected options of the plurality of options being sorted to a top of the second displayed portion. In other words, selection of expander control 230 may cause multiselect component 146 to be reopened with the selected options being sorted to the top of options list 212.

In operation of an example of system 100, including certain features performed by client device 106 in association with a search feature of certain embodiments of multiselect component 146, it will be assumed that multiselect component 146 is in the open state. Multiselect logic 119 may instruct, with multiselect component 146 in the open state, display of search field 220 for searching options of options list 212. Multiselect logic 119 may instruct, in response to detecting navigation to search field 220, playback by screen reader 132 of an announcement that searching is available. Multiselect logic 119 may search, in response to a search input, the options of options list 212.

If multiselect logic 119 identifies at least one matching option, then multiselect logic 119 may instruct, in response to a search execution command and in a state in which at least one matching option is identified, navigation to a first matching option of the at least one matching option and playback by screen reader 132 of an announcement indicating a name of the first matching option and an indication of a total number of matching options.

If multiselect logic 119 does not identify at least one matching option, then multiselect logic 119 may instruct, in response to the search input for which no match is identified, while navigation remains at search field 220, and prior to detecting additional input: display of a no-match indicator 304; and playback by screen reader 132 of an announcement indicating that no match is found.

Figure 4:
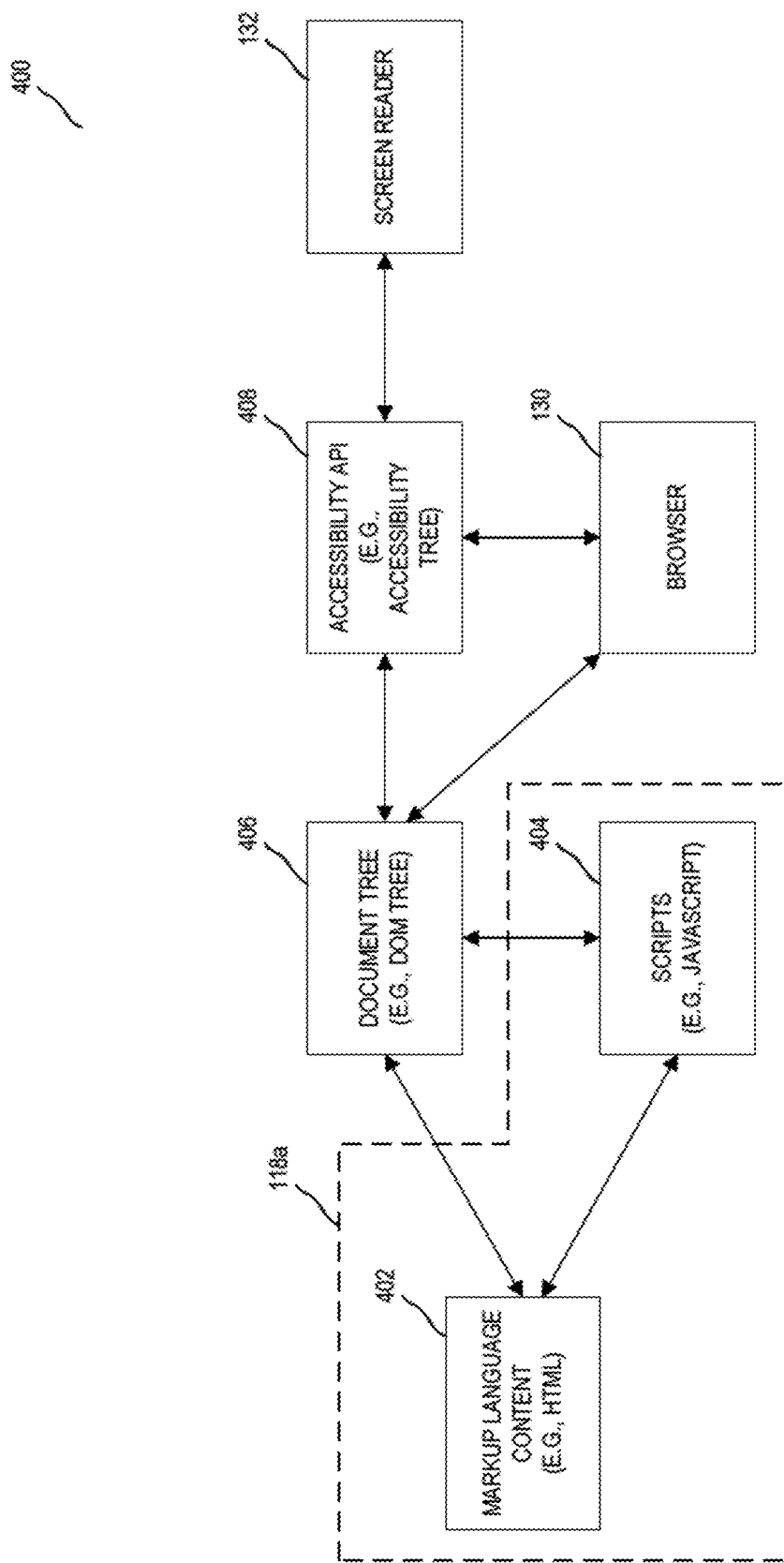
FIG. 4 illustrates a block diagram of example technique for providing a multiselect component, according to certain embodiments.

FIG. 4 illustrates a block diagram 400 of example technique for providing a multiselect component 146, according to certain embodiments. For example, block diagram 400 represents just one example of how web content (e.g., web content 118a of FIG. 1) may be displayed in a browser (e.g., browser 130) as GUI 144 with multiselect component 146 and interpreted by a screen reader (e.g., screen reader 132) for playback of announcements.

Block diagram 400 includes web content 118a (e.g., including markup language content 402 and/or scripts 404), document tree 406, accessibility application programming interface (API) 408, browser 130, and screen reader 132.

In the illustrated example, web content 118a is implemented using a combination of markup language content 402 and scripts 404. In certain embodiments, multiselect logic 119 (shown in FIG. 1) of web content 118a may be implemented using any suitable combination of markup language content 402, scripts 404, and other suitable content. Multiselect logic 119 may be part of web content 118a. Markup language content 402 may include any suitable combination of HTML, XML, and any other suitable markup language content. Scripts 404 may include any suitable combination of JavaScript and any other suitable script content. Scripts 404 may be used, for example, to provide dynamic content within a web page and/or web application.

Although shown as a separate box, scripts 404 could be embedded in markup language content 402. To the extent web content 118a is implemented, in whole or in part, using one or more scripts 404 (e.g., JavaScript code), scripts 404 may cause document tree 406 to be modified in response to user interaction with web content 118a.

In certain embodiments, browser 130 or another suitable component translates markup language content 402 into document tree 406, such as a Document Object Model (DOM) tree. Browser 130 may parse document tree 406 for display of web content 118a as GUI 144 in display 142 of FIG. 1. Although described as a tree, document tree 406 could be any suitable representation for parsing of web content 118a. Document tree 406 may be a node tree that includes multiple nodes. Generally, a root node includes a parent node vertically, the parent node includes a child node vertically, and a sibling node is a horizontal node.

In certain embodiments, for document tree 406, a root element is an <HTML> tag, a header element is a <head> tag, and a body element is a <body> tag. The <head> tag may be used to define a header of the HTML file, and may be a container for header elements. For example, the <head> tag may include tags such as <base>, <link>, <meta>, <script>, <style>, and <title>. The <body> tag may be the body of the HTML file. The <body> tag may include content that can be seen on a website (such as text, hyperlinks, images, tables, lists, etc.). Document tree 406 may treat each element of a website as an object, and may define objects and attributes of HTML elements and mechanisms for accessing those HTML elements. The HTML elements of a website, along with text and attributes included in the HTML elements, may be accessed using document tree 406.

In certain embodiments, web content 118a includes CSS content. If web content 118a includes CSS content, in certain embodiments, in conjunction with parsing the markup language file to construct document tree 406, browser 130 or another suitable component parses the CSS content to obtain corresponding style sheet rules. These style sheet rules may be placed on corresponding tree nodes of document tree 406, which may result in a document tree 406 with style attributes.

In certain embodiments, scripts 404 may dynamically modify content of GUI 144 (e.g., including, potentially, multiselect component 146) via document tree 406. For example, for web content 118a that includes scripts 404, a tree structure of document tree 406 after a script 404 is run (e.g., by browser 130 and/or a script engine, such as a JavaScript engine) may modify document tree 406 (e.g., prior to running of script 404).

Browser 130 may parse document tree 406 to render web content 118a into GUI 144 in display 142. In certain embodiments, the web content 118a rendered by browser 130 may include a multiselect component 146. As a user interacts with multiselect component 146, such as by opening and closing multiselect component 146, making selections/deselections from options list 212, viewing summary view 227, deselecting from selected options list 226, searching via search field 220, or performing other actions, document tree 406 may be modified. Browser 130 may parse modified document tree 406 to render web content 118a, as modified by scripts 404, into GUI 144 with an updated multiselect component 146 according to the user's actions.

Block diagram 400 includes an accessibility API 408, which facilitates allowing an accessibility tool (e.g., screen reader 132) to understand and act with respect to content (e.g., web content 118a). As described above, block diagram 400 includes screen reader 132, which is an example of an accessibility tool that can be used to audibly present (e.g., via speakers 138 and/or refreshable braille display 140) content of GUI 144 displayed on display 142. To interpret what is present on display 142 (e.g., in GUI 144), and particularly in the context of web content 118a presented by browser 130, screen reader 132 may access content of document tree 406 via accessibility API 408.

Accessibility API 408 represents objects in a user interface (e.g., GUI 144), exposing information about each object within the application (e.g., browser 130). In certain embodiments, certain items of information exist for an object, including a role, a name, and a state. An example role of an object may include, for example, a button, an application window, an image, or another suitable role. An example name of an object may include a character string that identifies the object within the interface. In the case of a visible label, such as text on an icon, the visible label might be the name. An example state an object may include a current condition for the object. For example, a checkbox might currently be selected or not selected.

In certain embodiments, accessibility API 408 may include MICROSOFT ACTIVE ACCESSIBILITY (MSAA)/IAccessible and/or IAccessible2, UI AUTOMATION (UIA) Express, NSAccessibility, UIAccessibility, or any other suitable accessibility API 408.

Accessibility API 408 may include or otherwise be implemented as an accessibility tree. In certain embodiments, accessibility API 408 may represent web content 118a (e.g., GUI 144 rendered from web content 118a) as a hierarchical tree, which may be referred to as an accessibility tree. For example, a web page or web application window may include multiple objects. In certain embodiments, focusable elements of GUI 144 may be represented as objects. A first example object may be a menu bar that includes multiple menus, each of which includes multiple menu items. The accessibility API may represent an object's relationship to other objects to provide context.

The accessibility tree may be generated from document tree 406, which may include or otherwise be supplemented by information derived from CSS. In certain embodiments, browser 130 or another suitable component maps document tree 406 into the accessibility tree. For example, browser 130 (or another suitable component) may use the HTML DOM, possibly with additional information derived from CSS, to generate an accessibility tree of the content that browser 130 is displaying. The accessibility tree may augment or replace document tree 406 to facilitate instructing playback of one or more announcements by screen reader 132.

Screen reader 132 may access the nodes of accessibility tree for information regarding what the node represents, such as the role, name, state, actions, or other information of the node. Screen reader 132 may use this information to maintain location of the user within multiselect component 146 (and/or other aspects of GUI 144) and to play back suitable announcements at appropriate times during a screen reader user's interaction with multiselect component 146.

In certain embodiments, multiselect logic 119 includes certain features for implementing multiselect component 146.

Certain embodiments of multiselect logic 119 implement one or more aspects of multiselect component 146 using one or more ARIA roles. For example, multiselect logic 119 may implement multiselect component 146 using, in part, a combination of JavaScript files and ARIA roles. For example, the JavaScript code could be separated into multiple JavaScript files that each have a corresponding purpose.

As a particular example, the JavaScript files may include the following four files: SelectMultiple.js; SelectMultipleContainer.js; SelectionSummary.js; and SelectMultipleValue.js. In certain embodiments, a SelectMultiple.js file may include code for the multiselect wrapper, and also may reference input field 202, indicator 204, control 206, selected quantity indicator 224, and any other suitable features of multiselect component 146. In certain embodiments, a SelectMultipleContainer.js file may include code for the container of options when multiselect component 146 is in an open state, and may include selection area 210, options list 212, selection instruction 214, search field 220, search indicator 222, and any other suitable features of multiselect component 146. In certain embodiments, a SelectionSummary.js file may include code for the select all/clear all button and summary of items selected, such as selected quantity indicator 216, quick action selection control 218, and any other suitable features of multiselect component 146. In certain embodiments, a SelectMultipleValue.js file may include code for the selected options displayed when multiselect component 146 is in a closed state, and may include selected options list 226, excess quantity indicator 228, expander control 230, and any other suitable features of multiselect component 146. Each of these example files may be implemented using any suitable combination of one or more files.

In certain embodiments, one or more of the following ARIA attributes may be used in multiselect logic 119 to implement multiselect component 146 in a way that is accessible to screen reader 132: aria-expanded; aria-haspopup; aria-label; aria-live; aria-role; aria-activedescendant; aria-multiselectable; aria-setsize; aria-posinset; aria-selected; aria-disabled. Each of the example ARIA attributes, according to certain embodiments, is described below.

The label "aria-expanded" may be used for input field 202 to indicate whether multiselect component 146 is in an open state or a closed state. The label "aria-haspopup" may indicate that input field 202 can be interacted with and will open a popup (e.g., selection area 210). The label "aria-label" may be a string of text read by screen reader 132 when an associated element of multiselect component 146 is navigated to, which may provide a user of screen reader 132 with additional context. In certain embodiments, the label "aria-label" may be used for input field 202, control 206, options list 212 (e.g., potentially including options within options list 212), quick action selection option 218, search field 220, selected quantity indicator 224, selected options list 226 (e.g., potentially including options within selected options list 226), and any other suitable features of multiselect component 146. The label "aria-live" may indicate that an element of multiselect component 146 will be changed and creates an announcement for screen reader 132 to notify users when the element does change. As just two examples, the label "aria-live" may be used in multiselect component 146 to announce when the user has reached the limit of options selected and/or when an option is unselected. The label "role" may associate a semantic meaning with an element. Roles can effect interaction and the way an element is read by screen reader 132. The label "aria-activedescendant" may identify the active option within the list of options (e.g., options list 212 and/or selection options list 226) in multiselect component 146. The label "aria-multiselectable" may indicate that users can make multiple selections within multiselect component 146. The label "aria-setsize" may indicate the total number of options within multiselect component 146. The label "aria-posinset" may be the index of the current item that is being interacted with within multiselect component 146. The label "aria-selected" may indicate whether or not an option is selected.

The label "aria-disabled" may indicate whether an option or the entire multiselect component 146 is disabled.

Furthermore, the ARIA roles may define one or more ARIA live regions, which may define an area of GUI 144, including potentially a portion or all of multiselect component 146, that is observed for changes, and if a change is detected, display of GUI 144 is updated and playback of an announcement is triggered. For example, an ARIA live region may define an area of multiselect component 146 that multiselect logic 119 is monitoring for changes (e.g., selection, deselection, search input, etc.), and if multiselect logic 119 detects a change, multiselect logic 119 may instruct browser 130 to display certain information in a particular way and screen reader 132 to make certain announcements related to the change. Additionally, example states of multiselect component 146 that may be monitored using ARIA live regions are open and closed.

Although particular example contents of multiselect logic 119 are described, this disclosure contemplates implementing multiselect component 146 and/or multiselect logic 119 in any suitable manner.

Multiselect logic 119 of web content 118a, as shown in FIG. 1, may be implemented using any suitable combination markup language content 402, scripts 404, CSS (or other stylesheet content), a document tree 406 (e.g., a DOM tree), an accessibility tree, or any other suitable code or other information used to generate multiselect component 146. Furthermore, the content of multiselect logic 119 might be the same from server system 102 to client device 106 or may change from server system 102 to client device 106. For example, multiselect logic 119 instructing and/or performing display, playback of an announcement, searching, or other suitable operations may include multiselect logic 119 as it exists on server system 102 and/or as multiselect logic 119 may be modified on client device 106.

FIGS. 5, 6A-6B, 7, and 8 illustrate example methods for providing a multiselect component 146, according to certain embodiments. Throughout FIGS. 5, 6A-6B, 7, and 8, multiselect component is abbreviated MSC to reduce space in the figures. The methods illustrated in FIGS. 5, 6A-6B, 7, and 8 may be combined or further divided in any suitable manner. Each of these figures is described below.

Figure 5:
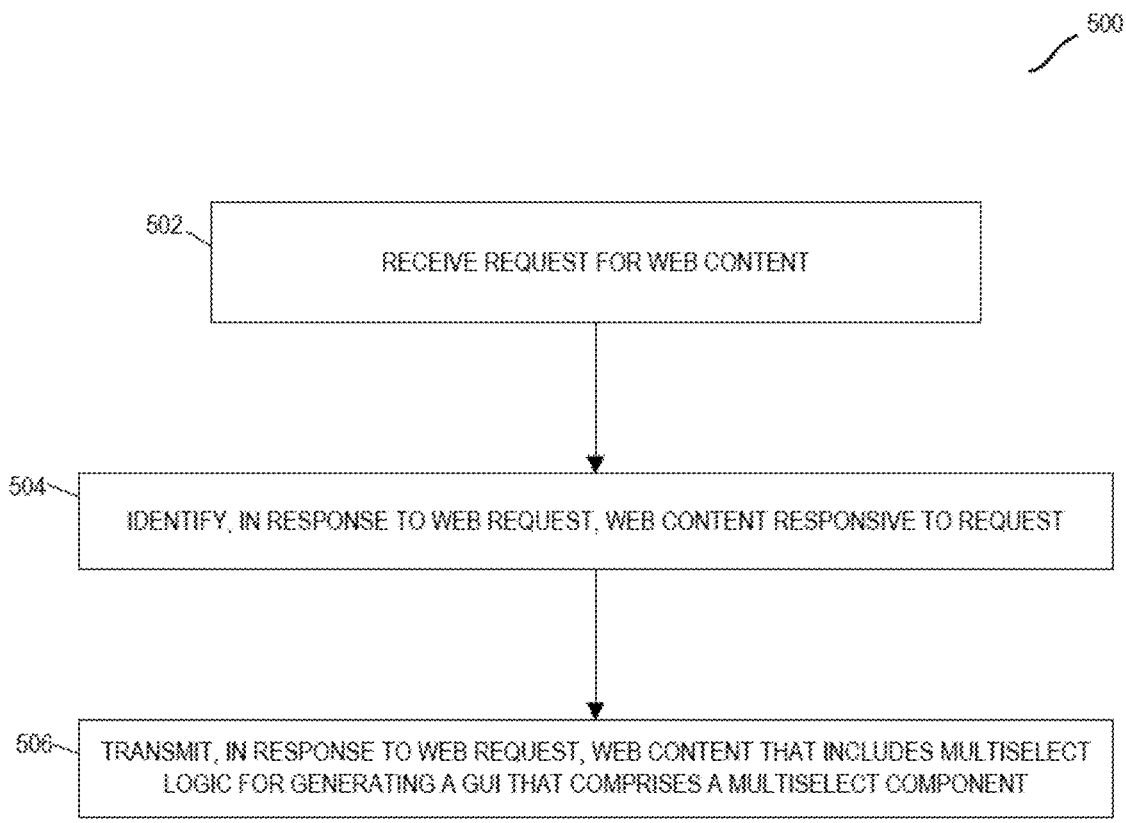
FIG. 5 illustrates an example method for providing a multiselect component, according to certain embodiments.

FIG. 5 illustrates an example method 500 for providing a multiselect component 146, according to certain embodiments. In certain embodiments, some or all of the operations associated with method 500 are performed by server system 102 or an entity associated with server system 102.

At step 502, server system 102 (e.g., logic 117) receives, from client 106, web request 148 for web content 118. For example, web request 148 may be an HTTP request, an HTTPS request, or other suitable type of request. The requested web content 118 may be a web page, web application, or other suitable type of web content.

At step 504, server system 102 (logic 117) identifies, in response to web request 148, web content 118 that is responsive to web request 148 (e.g., using any suitable lookup mechanism). In the illustrated example of FIG. 1, the web content 118 that is identified by server system 102 is web content 118a, which may be a web page, web application, or other suitable type of web content.

At step 506, server system 102 (logic 117) transmits, to client 106 in response to web request 148, web content 118. That is, server system 102 may transmit the web content 118 that is identified at step 504 to client 106 as response 150. In the illustrated example of FIG. 1, the web content 118 that is identified by server system 102 and transmitted to client 106 is web content 118a. For purposes of this example, it will be assumed that the web content 118a transmitted to client device 106 includes multiselect logic 119 for generating a multiselect component 146 that has features according to certain embodiments of this disclosure.

Figure 6A:
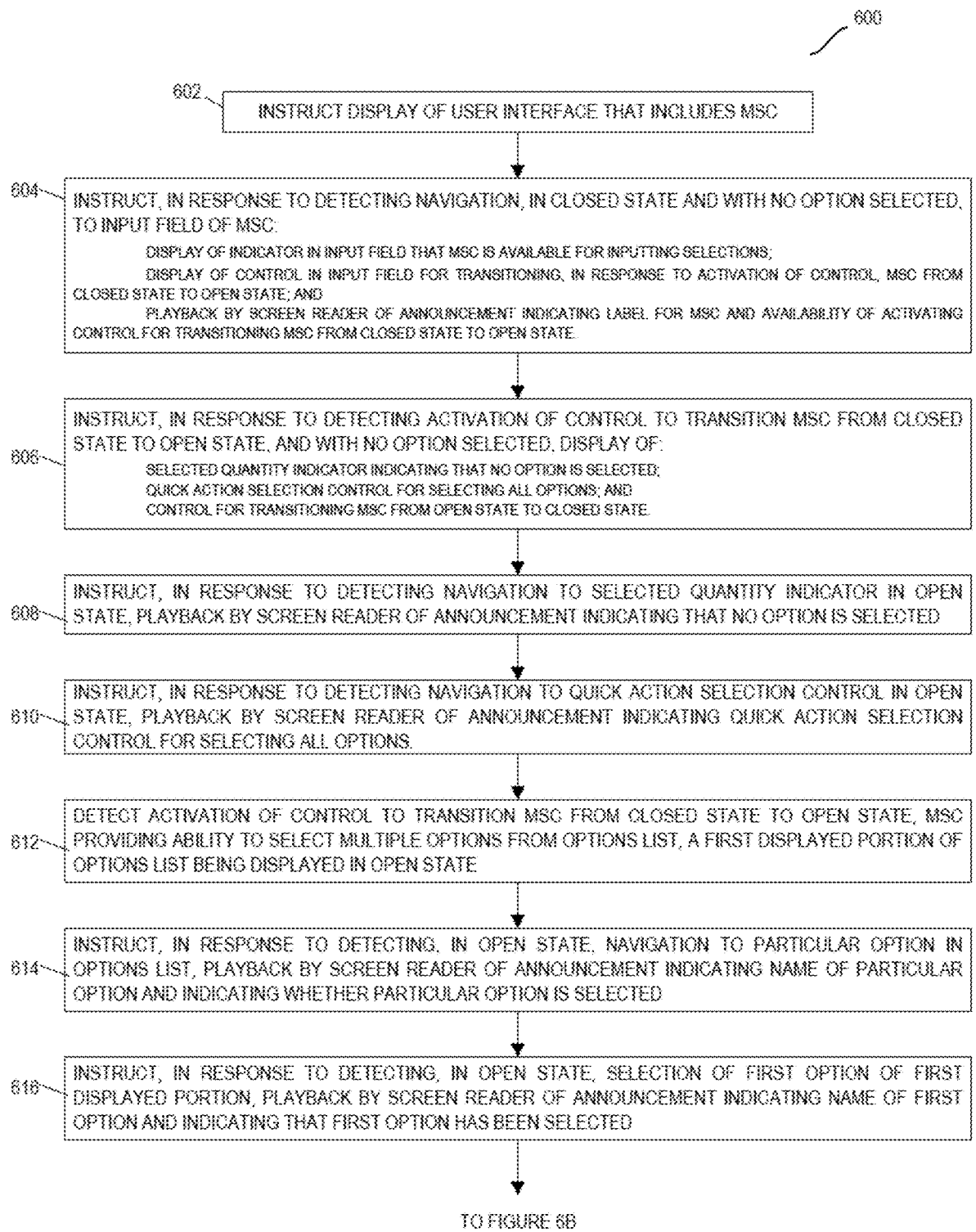
FIGS. 6A-6B illustrate an example method for providing a multiselect component, according to certain embodiments.
Figure 6B:
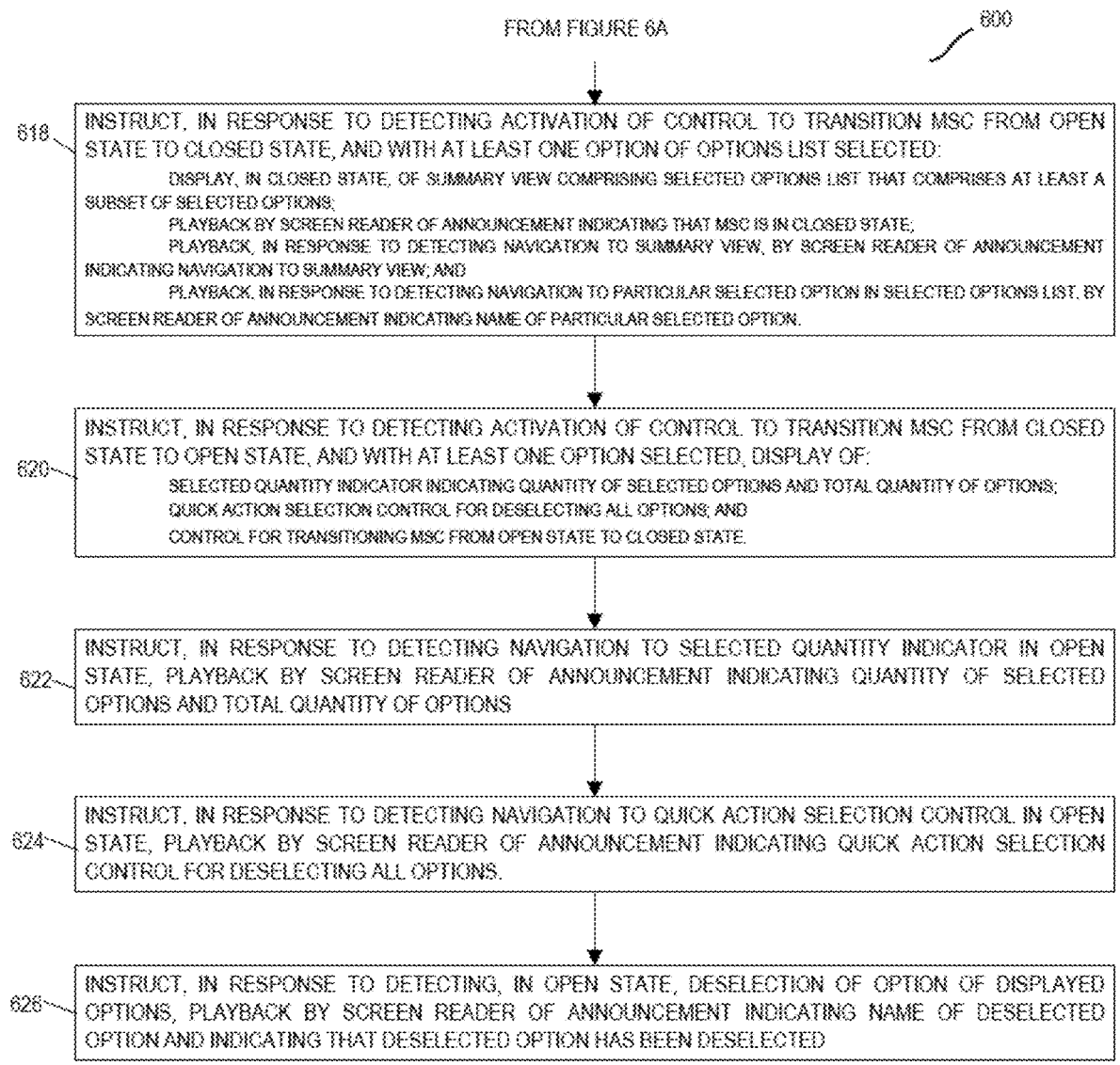

FIGS. 6A-6B illustrate an example method 600 for providing a multiselect component 146, according to certain embodiments. In certain embodiments, some or all of the operations associated with method 600 are performed by client device 106.

Starting in FIG. 6A, at step 602, multiselect logic 119 may instruct display (e.g., by browser 130) of a user interface that includes multiselect component 146. Multiselect component 146 may provide an ability to select multiple options from a displayable options list 212 that includes multiple options. Multiselect component 146 may have an open state and a closed state, with options list 212 being displayed in the open state. Initially, multiselect component 146 may be in a closed state in which options list 212 is not displayed.

At step 604, in response to detecting navigation, in the closed state and with no options from options list 212 selected, to input field 202 of multiselect component 146, multiselect logic 119 may instruct: display (e.g., by browser 130) of indicator 204 in input field 202 that multiselect component 146 is available for inputting selections; display (e.g., by browser 130) of control 206 in input field 202 for transitioning, in response to activation of control 206, multiselect component 146 from the closed state to the open state; and playback by screen reader 132 of an announcement indicating label 208 for multiselect component 146 and an availability of activating control 206 in input field 202 for transitioning multiselect component 146 from the closed state to the open state. As just one example, in response to detecting navigation to input field 202 of multiselect component 146, multiselect logic 119 may instruct playback by screen reader 132 of an announcement stating: "<Name><x number> selected. Select listbox popup collapsed."

At step 606, in response to detecting activation of control 206 to transition multiselect component 146 from the closed state to the open state, and with no option of the plurality of options of options list 212 selected, multiselect logic may instruct display (e.g., by browser 130) of: selected quantity indicator 216 and/or selected quantity indicator 224 that indicates that no option is selected; quick action selection control 218 for selecting all options; and control 206 for transitioning multiselect component 146 from the open state to the closed state.

At step 608, in response to detecting navigation to selected quantity indicator 216/224 with multiselect component 146 in the open state, multiselect logic 119 may instruct playback by screen reader 132 of an announcement indicating that no option is selected.

At step 610, in response to detecting navigation to quick action selection control 218 with multiselect component 146 in the open state, multiselect logic 119 may instruct playback by screen reader 132 of an announcement indicating quick action selection control 218 for selecting all options.

At step 612, multiselect logic 119 may detect activation of control 206 to transition multiselect component 146 from the closed state to the open state. A first displayed portion of the options of options list 212 are displayed when multiselect component 146 is in the open state. For example, step 612 may include multiselect logic 119 instructing, in response to detecting activation of control 206 to transition multiselect component 146 from the closed state to the open state, display (e.g., by browser 130) of the first displayed portion of the options of options list 212 (e.g., in selection area 210)

and playback by screen reader 132 of an announcement indicating that multiselect component 146 is in the open state.

The first displayed portion could be all options of options list 212 (e.g., all selectable options of multiselect component 146) or could be less than all options of options list 212. Whether the first displayed portion includes some or all of the options of options list 212 may depend on any suitable factors, but such factors could include a quantity of options in options list and how many can reasonably be displayed in a visually appealing and functional manner.

At step 614, in response to detecting, with multiselect component 146 in the open state, navigation to a particular option in options list 212, multiselect logic 119 may instruct playback by screen reader 132 of an announcement indicating a name of the particular option and indicating whether the particular option is selected. Thus, in certain embodiments, the trigger for announcing names and selections statuses of options in options list 212 may be navigation to those particular options in options list, which may provide increased control to users of screen reader 132 over when announcements are made in relation to options in options list 212.

At step 616, in response to detecting, with multiselect component 146 in the open state, selection of a first option of the first displayed portion of the options in options list 212, multiselect logic 119 may instruct playback by screen reader 132 of an announcement indicating a name of the first option and indicating that the first option has been selected.

Turning to FIG. 6B, at step 618, it will be assumed that one or more options from options list 212 are currently selected (e.g., are selected options). At step 618, in response to detecting activation of control 206 to transition multiselect component 146 from the open state to the closed state, and with at least one option of the plurality of options selected, multiselect logic 119 may instruct: display (e.g., by browser 130), with multiselect component 146 in the closed state, of summary view 227 that includes selected options list 226 having at least a subset of the one or more selected options; and playback by screen reader 132 of an announcement indicating that multiselect component 146 is in the closed state. In response to detecting navigation to summary view 227, multiselect logic 119 may instruct playback by screen reader 132 of an announcement indicating navigation to summary view 227 that includes selected options list 226. In response to detecting navigation to a particular selected option of the one or more selected options in selected options list 226, multiselect logic 119 may instruct playback by screen reader 132 of an announcement indicating a name of the particular selected option.

This disclosure describes additional details of example embodiments related to summary view 227 in greater detail below with reference to FIG. 7, as well as elsewhere in this disclosure.

At step 620, in response to detecting activation of control 206 to transition multiselect component 146 from the closed state to the open state, and with at least one option of the plurality of options of options list 212 selected, multiselect logic 119 may instruct display (e.g., by browser 130) of: selected quantity indicator 216 that indicates a quantity of selected options and a total quantity of options in options list 212; quick action selection control 218 for deselecting all options (e.g., deselecting all currently selected options); and control 206 for transitioning multiselect component 146 from the open state to the closed state.

At step 622, in response to detecting navigation to selected quantity indicator 216 with multiselect component 146 in the open state, multiselect logic 119 may instruct playback by screen reader 132 of an announcement indicating the quantity of selected options and a total quantity of options of option list 212.

At step 624, in response to detecting navigation to quick action selection control 218 with multiselect component 146 in the open state, multiselect logic 119 may instruct playback by screen reader 132 of an announcement indicating quick action selection control 218 for deselecting all options (e.g., deselecting all currently selected options).

At step 626, in response to detecting, with multiselect component 146 in the open state, deselection of a second option of the displayed options of options list 212, multiselect logic 119 may instruct playback by screen reader 132 of an announcement indicating a name of the second option (the deselected option) and indicating that the second option (the deselected option) has been deselected.

Figure 7:
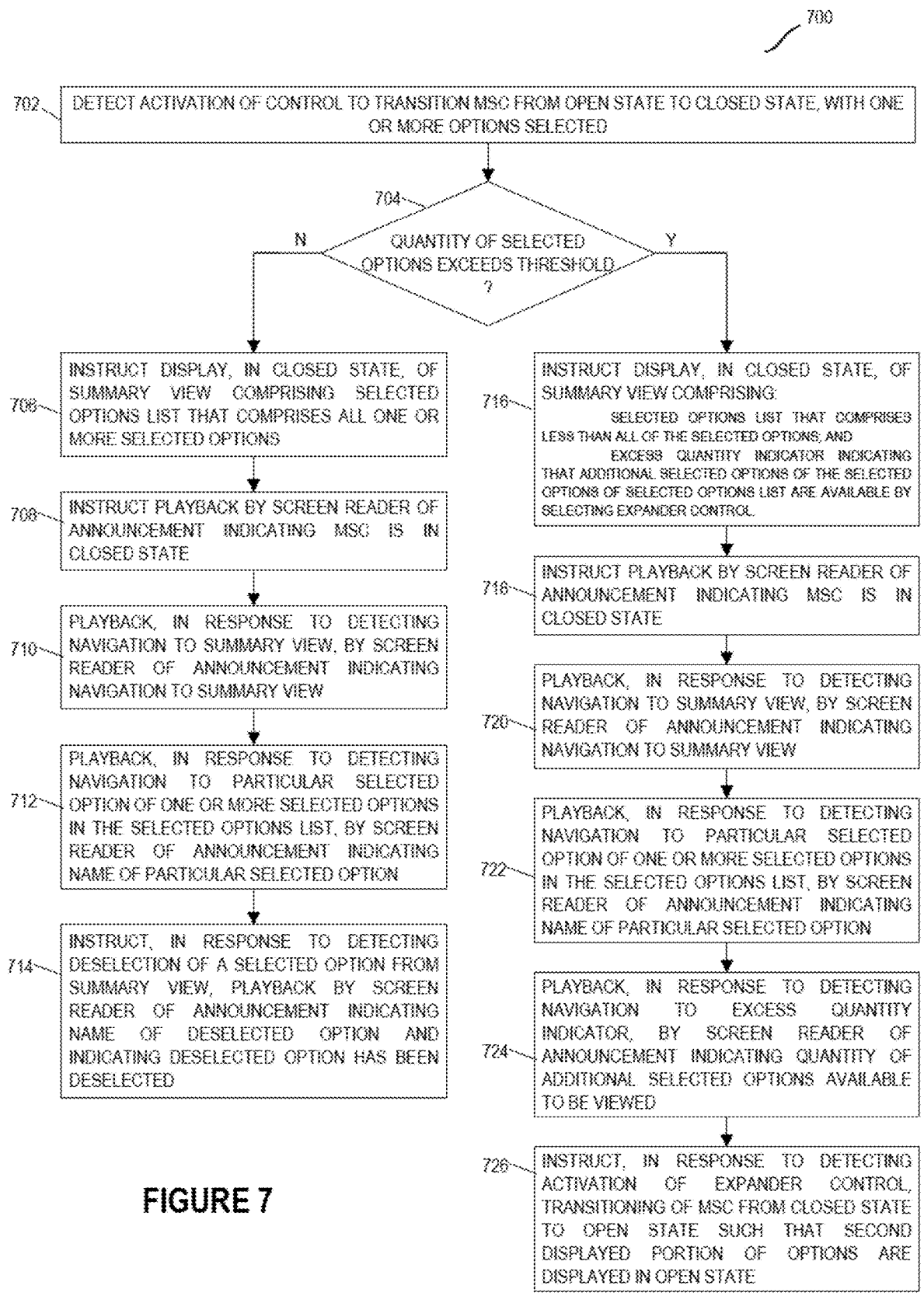
FIG. 7 illustrates an example method for providing a multiselect component, according to certain embodiments.

FIG. 7 illustrates an example method 700 for providing a multiselect component 146, according to certain embodiments. In certain embodiments, some or all of the operations associated with method 700 are performed by client device 106. Method 700 illustrates certain aspects associated with summary view 227, described above, which may be in addition to or as an alternative to steps 618-620 described above with reference to FIGS. 6A-6B. At the start of method 700, it will be assumed that multiselect component 146 is in the open state and that one or more options from options from options list 212 are currently selected.

At step 702, multiselect logic 119 may detect activation of control 206 to transition multiselect component 146 from an open state to a closed state, and with at least one option of options list 212 selected. In other words, the options of options list 212 may include one or more selected options, and the one or more selected options of options list may be currently selected.

At step 704, multiselect logic 119 may determine whether a quantity of selected options from options list 212 exceeds a threshold number of selected options that may be displayed in selected options list 226 of summary view 227. The threshold may be set to any suitable value, or may be omitted if desired. Although described as exceeding (or not exceeding) the threshold, a case of matching the threshold could be treated as exceeding or not exceeding the threshold, according to particular implementations.

If multiselect logic 119 determines at step 704 that the quantity of selected options from options list 212 does not exceed the threshold, then at step 706, multiselect logic 119 may instruct display (e.g., by browser 130), with multiselect component 146 in the closed state, of summary view 227 that includes selected options list 226. Selected options list 226 may include at least a subset of the one or more selected options. In this example, because multiselect logic 119 determines at step 704 that the quantity of selected options from options list 212 does not exceed the threshold, selected options list 226 may include all of the one or more selected options. At step 708, multiselect logic 119 may instruct playback by screen reader 132 of an announcement indicating that multiselect component 146 is in the closed state.

At step 710, in response to detecting navigation to summary view 227, multiselect logic 119 may instruct playback by screen reader 132 of an announcement indicating navigation to summary view 227. At step 712, in response to detecting navigation to a particular selected option of the one or more selected options in selected options list 226, multiselect logic 119 may instruct playback by screen reader 132 of an announcement indicating a name of the particular selected option.

At step 714, in response to detecting, with multiselect component 146 in the closed state and with summary view 227 displayed, deselection of a first selected option of the one or more selected options (e.g., in selected options list 226), multiselect logic 119 may instruct playback by screen reader 132 of an announcement indicating a name of the first selected option (the deselected option) and indicating that the first selected option (the deselected option) has been deselected.

Returning to step 704, if multiselect logic 119 determines at step 704 that the quantity of selected options from options list 212 exceeds the threshold, then at step 716, multiselect logic 119 may instruct display (e.g., by browser 130), with multiselect component 146 in the closed state, of summary view 227 that includes selected options list 226. Selected options list 226 may include at least a subset of the one or more selected options. In this example, because multiselect logic 119 determines at step 704 that the quantity of selected options from options list 212 exceeds the threshold, selected options list 226 may include less than all of the selected options. Additionally, in this example, multiselect logic 229 may instruct that summary view 227 include excess quantity indicator 228 indicating that additional selected options of the one or more selected options of the selected options list are available by selecting an expander control 230.

Steps 718-722 are generally analogous to previously-described steps 708-712, and thus the descriptions of steps 718-722 are incorporated by reference. That is, although selected options list 226 of summary view 227 includes less than all of the selected options when the quantity of selected options exceeds a threshold, interaction with summary view 227 (and particularly with those selected options that are displayed) may be similar to when all selected options are displayed.

Additionally, although a step analogous to step 714 is not shown or described, in certain embodiments, deselection form a summary view 227 that includes less than all of the selected options in selected options list 226 may be possible in a similar manner. Furthermore, as described above with reference to FIG. 2H, deselecting a selected option in such a scenario may alter which selected options are displayed in selected options list 226 of summary view 227, as such deselection may result in another previously-undisplayed selected option being displayed in summary view 227 (if a quantity of selected options still exceeds the threshold following the deselection) or in all selected options being displayed in summary view 227 (if a quantity of selected options no longer exceeds the threshold following the deselection).

At step 724, in response to detecting navigation to excess quantity indicator 228, multiselect logic 119 may instruct playback by screen reader 132 of an announcement indicating a quantity of additional selected options of the one or more selected options that are available to be viewed.

At step 726, in response to detecting activation of expander control 230, multiselect logic 119 may transition multiselect component 146 from the closed state to the open state such that a second displayed portion of the plurality of options are displayed in the open state, the one or more selected options of the plurality of options being sorted to a top of the second displayed portion. In other words, selection of expander control 230 may cause multiselect component 146 to be reopened with the selected options being sorted to the top of options list 212.

Figure 8:
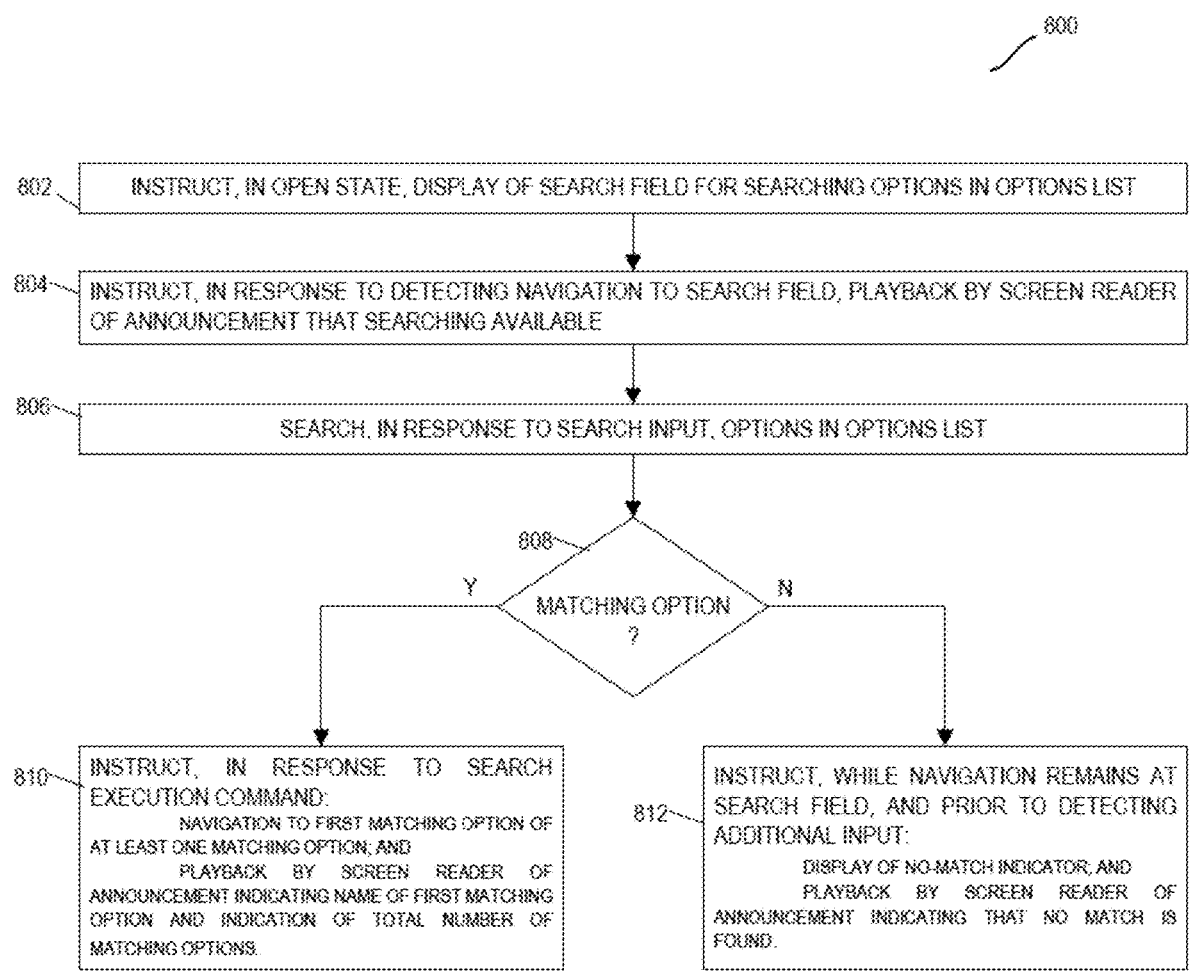
FIG. 8 illustrates an example method for providing a multiselect component, according to certain embodiments.

FIG. 8 illustrates an example method 800 for providing a multiselect component 146, according to certain embodiments. In certain embodiments, some or all of the operations associated with method 800 are performed by client device 106. Method 800 illustrates certain aspects associated with a search feature of certain embodiments of multiselect component 146, described above. At the start of method 800, it will be assumed that multiselect component 146 is in the open state.

At step 802, multiselect logic 119 may instruct, with multiselect component 146 in the open state, display of search field 220 for searching options of options list 212.

At step 804, multiselect logic 119 may instruct, in response to detecting navigation to search field 220, playback by screen reader 132 of an announcement that searching is available.

At step 806, multiselect logic 119 may search, in response to a search input, the options of options list 212.

If multiselect logic 119 identifies, at step 808, at least one matching option, then at step 810, multiselect logic 119 may instruct, in response to a search execution command and in a state in which at least one matching option is identified, navigation to a first matching option of the at least one matching option and playback by screen reader 132 of an announcement indicating a name of the first matching option and an indication of a total number of matching options.

Returning to step 808, if multiselect logic 119 does not identify, at step 808, at least one matching option, then at step 812, multiselect logic 119 may instruct, in response to the search input for which no match is identified, while navigation remains at search field 220, and prior to detecting additional input: display of a no-match indicator 304; and playback by screen reader 132 of an announcement indicating that no match is found.

Figure 9:
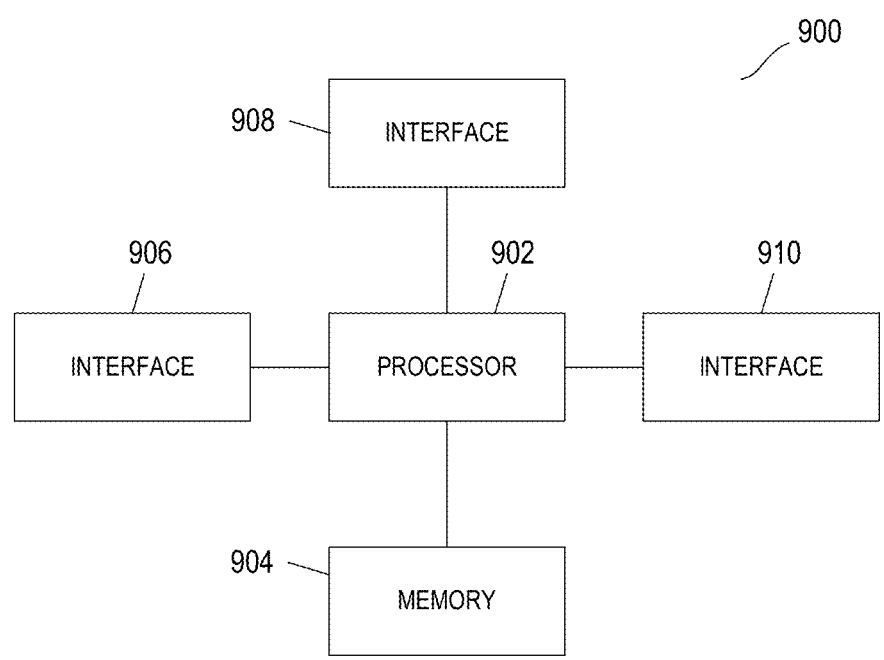
FIG. 9 illustrates a block diagram of an example computer system, according to certain embodiments.

FIG. 9 illustrates a block diagram of an example computer system 900, according to certain embodiments. Computer system 900 can be configured to perform one or more operations related to system 100 (e.g., including server system 102 and/or client device 106), user interface screens of FIGS. 2A-2H, user interface screens of FIGS. 3A-3E, block diagram 400, methods 500, method 600, method 700, method 800, and/or other suitable computer systems or methods. For example, these systems and methods may be implemented using one or more computer systems 900. Further, any processing and analysis can be partly or fully performed by the computer system 900.

Computer system 900 may be implemented using any suitable combination of hardware, firmware, and software. Computer system 900 includes one or more processors 902, one or more memories 904, and interfaces 906-910, which may (or may not) be arranged as shown. Computer system 900 may include any suitable number of processors 902, memories 904, and interfaces 906-910.

Processor 902 may be any component or collection of components adapted to perform computations and/or other processing related tasks. Processor 902 may be a programmable logic device, a microcontroller, a microprocessor, any suitable processing device, or any suitable combination of the preceding.

Memory 904 may be any component or collection of components adapted to store programming and/or instructions for execution by the processor 902. Memory 904 may include any one or a combination of volatile or non-volatile local or remote devices suitable for storing information. For example, memory 904 may include RAM, ROM, magnetic storage devices, optical storage devices, or any other suitable information storage device or a combination of these devices. In certain embodiments, memory 904 includes a non-transitory computer-readable medium. Memory 904 may store one or more computer programs for execution by processor 902, the one or more computer programs includes instructions for performing operations and that when executed by the process cause the process to perform those operations.

Interfaces 906, 908, 910 may be any component or collection of components that allow computer system 900 to communicate with other devices/components and/or a user. For example, one or more of the interfaces 906, 908, 910 may be adapted to communicate data, control, or management messages from the processor 902 to applications installed on the host device and/or a remote device.

Certain embodiments may provide none, some, or all of the following technical advantages. These and other potential technical advantages may be described elsewhere in this disclosure, or may otherwise be readily apparent to those skilled in the art based on this disclosure.

Certain embodiments may improve use of computer system resources by more efficiently presenting information associated with a multiselect component to screen reader users, reducing resource use for navigating potentially long lists of options.

Certain embodiments allow screen reader users to more efficiently interact with multiselect components by instructing display and associated announcements in a way that more efficiently presents relevant information to screen readers users, allowing screen reader users to more efficiently interact with the multiselect component. For example, certain embodiments may instruct announcement that provide context for screen reader users regarding what options are available, what options have been selected, and other information, to thereby facilitate efficient navigation. As another example, certain embodiments provide screen reader users greater control over when certain announcements are made, thereby making the screen reader user's experience more efficient and reducing a load on system resources.

Certain embodiments instruct display of and associated announcements for a summary view when the multiselect component is in a closed state, with the summary view including certain selected quantity information and a selected options list that includes the options that have been selected. The summary view may provide a convenient mechanism for screen reader users to quickly ascertain and interact with selected options without opening the full options list, which may create a more efficient and user-friendly experience.

Certain embodiments are keyboard navigable, such that a user who cannot or prefers not to interact with the interface using mouse can still navigate the interface using keyboard commands.

It should be understood that the systems and methods described in this disclosure may be combined in any suitable manner.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A computer system, comprising:
one or more processors; and
one or more non-transitory computer-readable storage media storing programming for execution by the one or more processors, the programming comprising instructions to:
instructing display of a user interface that comprises a multiple selection component, the multiple selection component having an open state and a closed state;
detect activation of a control to transition the multiple selection component from the closed state to the open state, the multiple selection component providing an ability to select multiple options from an options list that comprises a plurality of options, a first displayed portion of the plurality of options being displayed in the open state;
instruct, in response to detecting, in the open state, navigation to a particular option in the options list, playback by a screen reader of an announcement indicating a name of the particular option and indicating whether the particular option is selected; and
instruct, in response to detecting, in the open state, selection of a first option of the first displayed portion of the plurality of options, playback by a screen reader of an announcement indicating a name of the first option and indicating that the first option has been selected.

2. The computer system of claim 1, wherein the programming further comprises instructions to:
instruct, in response to detecting activation of the control to transition the multiple selection component from the closed state to the open state, and with at least one option of the plurality of options selected, display of:
a selected quantity indicator that indicates a quantity of selected options and a total quantity of options;
a quick action selection control for deselecting all options; and
a control for transitioning the multiple selection component from the open state to the closed state;
instruct, in response to detecting navigation to the selected quantity indicator in the open state, playback by the screen reader of an announcement indicating the quantity of selected options and a total quantity of options; and
instruct, in response to detecting navigation to the quick action selection control in the open state, playback by the screen reader of an announcement indicating the quick action selection control for deselecting all options.

3. The computer system of claim 1, wherein the programming further comprises instructions to:
instruct, in response to detecting activation of the control to transition the multiple selection component from the closed state to the open state, and with no option of the plurality of options selected, display of:

a selected quantity indicator that indicates that no option is selected;
a quick action selection control for selecting all options; and
a control for transitioning the multiple selection component from the open state to the closed state;
instruct, in response to detecting navigation to the selected quantity indicator in the open state, playback by the screen reader of an announcement indicating that no option is selected; and
instruct, in response to detecting navigation to the quick action selection control in the open state, playback by the screen reader of an announcement indicating the quick action selection control for selecting all options.

4. The computer system of claim 1, wherein:
the plurality of options comprise one or more selected options, the one or more selected options being options of the plurality of options that are currently selected; and
the programming further comprises instructions to instruct, in response to detecting activation of a control to transition the multiple selection component from the open state to the closed state, and with at least one option of the plurality of options selected:
display, in the closed state, of a summary view comprising a selected options list, the selected options list comprising at least a subset of the one or more selected options;
playback by the screen reader of an announcement indicating that the multiple selection component is in the closed state;
playback, in response to detecting navigation to the summary view, by the screen reader of an announcement indicating navigation to the summary view that includes the selected options list; and
playback, in response to detecting navigation to a particular selected option of the one or more selected options in the selected options list, by the screen reader of an announcement indicating a name of the particular selected option.

5. The computer system of claim 4, wherein the programming further comprises instructions to instruct, in response to detecting that a quantity of the one or more selected options in the selected options list exceeds a threshold:
display of the summary view to include:
less than all of the one or more selected options of the selected options list; and
an excess quantity indicator indicating that additional selected options of the one or more selected options of the selected options list are available by selecting an expander control; and
playback, in response to detecting navigation to the excess quantity indicator, by the screen reader of an announcement indicating a quantity of additional selected options of the one or more selected options that are available to be viewed.

6. The computer system of claim 5, wherein the programming further comprises instructions to instruct, in response to detecting activation of the expander control, transitioning of the multiple selection component from the closed state to the open state such that a second displayed portion of the plurality of options are displayed in the open state, the one or more selected options of the plurality of options being sorted to a top of the second displayed portion.

7. The computer system of claim 1, wherein the programming further comprises instructions to:

instruct, in the open state, display of a search field for searching the plurality of options;
instruct, in response to detecting navigation to the search field, playback by the screen reader of an announcement that searching is available;
search, in response to a search input, the plurality of options;
instruct, in response to a search execution command and in a state in which at least one matching option is identified:
navigation to a first matching option of the at least one matching option; and
playback by a screen reader of an announcement indicating a name of the first matching option and an indication of a total number of matching options.

8. The computer system of claim 1, wherein the programming further comprises instructions to:
instruct, in the open state, display of a search field for searching the plurality of options;
instruct, in response to detecting navigation to the search field, playback by the screen reader of an announcement that searching is available;
search, in response to a search input, the plurality of options; and
instruct, in response to a first search input for which no match is identified, while navigation remains at the search field, and prior to detecting additional input:
display of a no-match indicator; and
playback by a screen reader of an announcement indicating that no match is found.

9. A computer-implemented method, comprising:
instructing display of a user interface that comprises a multiple selection component, the multiple selection component having an open state and a closed state;
detecting activation of a control to transition the multiple selection component from the closed state to the open state, the multiple selection component providing an ability to select multiple options from an options list that comprises a plurality of options, a first displayed portion of the plurality of options being displayed in the open state;
instructing, in response to detecting, in the open state, navigation to a particular option in the options list, playback by a screen reader of an announcement indicating a name of the particular option and indicating whether the particular option is selected; and
instructing, in response to detecting, in the open state, selection of a first option of the first displayed portion of the plurality of options, playback by a screen reader of an announcement indicating a name of the first option and indicating that the first option has been selected.

10. The computer-implemented method of claim 9, further comprising:
instructing, in response to detecting activation of the control to transition the multiple selection component from the closed state to the open state, and with at least one option of the plurality of options selected, display of:
a selected quantity indicator that indicates a quantity of selected options and a total quantity of options;
a quick action selection control for deselecting all options; and
a control for transitioning the multiple selection component from the open state to the closed state;
instructing, in response to detecting navigation to the selected quantity indicator in the open state, playback by the screen reader of an announcement indicating the quantity of selected options and a total quantity of options; and instructing, in response to detecting navigation to the quick action selection control in the open state, playback by the screen reader of an announcement indicating the quick action selection control for deselecting all options.

11. The computer-implemented method of claim 9, further comprising:

instructing, in response to detecting activation of the control to transition the multiple selection component from the closed state to the open state, and with no option of the plurality of options selected, display of:
a selected quantity indicator that indicates that no option is selected;
a quick action selection control for selecting all options; and
a control for transitioning the multiple selection component from the open state to the closed state;

instructing, in response to detecting navigation to the selected quantity indicator in the open state, playback by the screen reader of an announcement indicating that no option is selected; and instructing, in response to detecting navigation to the quick action selection control in the open state, playback by the screen reader of an announcement indicating the quick action selection control for selecting all options.

12. The computer-implemented method of claim 9, further comprising instructing, in response to detecting navigation, in the closed state and with no option of the plurality of options selected, to an input field of the multiple selection component:

display of an indicator in the input field that the multiple selection component is available for inputting selections;
display of the control in the input field for transitioning, in response to activation of the control, the multiple selection component from the closed state to the open state; and
playback by the screen reader of an announcement indicating a label for the multiple selection component and an availability of activating the control in the input field for transitioning the multiple selection component from the closed state to the open state.

13. The computer-implemented method of claim 9, wherein:

the plurality of options comprise one or more selected options, the one or more selected options being options of the plurality of options that are currently selected; and the method further comprises instructing, in response to detecting activation of a control to transition the multiple selection component from the open state to the closed state, and with at least one option of the plurality of options selected:
display, in the closed state, of a summary view comprising a selected options list, the selected options list comprising at least a subset of the one or more selected options;
playback by the screen reader of an announcement indicating that the multiple selection component is in the closed state;
playback, in response to detecting navigation to the summary view, by the screen reader of an announcement indicating navigation to the summary view that includes the selected options list; and
playback, in response to detecting navigation to a particular selected option of the one or more selected options in the selected options list, by the screen reader of an announcement indicating a name of the particular selected option.

14. The computer-implemented method of claim 13, further comprising instructing, in response to detecting that a quantity of the one or more selected options in the selected options list exceeds a threshold:

display of the summary view to include:
less than all of the one or more selected options of the selected options list; and
an excess quantity indicator indicating that additional selected options of the one or more selected options of the selected options list are available by selecting an expander control; and playback, in response to detecting navigation to the excess quantity indicator, by the screen reader of an announcement indicating a quantity of additional selected options of the one or more selected options that are available to be viewed.

15. The computer-implemented method of claim 14, further comprising instructing, in response to detecting activation of the expander control, transitioning of the multiple selection component from the closed state to the open state such that a second displayed portion of the plurality of options are displayed in the open state, the one or more selected options of the plurality of options being sorted to a top of the second displayed portion.

16. The computer-implemented method of claim 13, further comprising instructing, in response to detecting, in the closed state with the summary view displayed, deselection of a first selected option of the one or more selected options, playback by a screen reader of an announcement indicating a name of the first selected option and indicating that the first selected option has been deselected.

17. The computer-implemented method of claim 9, further comprising instructing, in response to detecting, in the open state, deselection of a second option of the first displayed portion of the plurality of options, playback by a screen reader of an announcement indicating a name of the second option and indicating that the second option has been deselected.

18. The computer-implemented method of claim 9, further comprising:

instructing, in the open state, display of a search field for searching the plurality of options;
instructing, in response to detecting navigation to the search field, playback by the screen reader of an announcement that searching is available;
searching, in response to a search input, the plurality of options;
instructing, in response to a search execution command and in a state in which at least one matching option is identified:
navigation to a first matching option of the at least one matching option; and
playback by a screen reader of an announcement indicating a name of the first matching option and an indication of a total number of matching options.

19. The computer-implemented method of claim 9, further comprising:

instructing, in the open state, display of a search field for searching the plurality of options;

instructing, in response to detecting navigation to the search field, playback by the screen reader of an announcement that searching is available;

searching, in response to a search input, the plurality of options; and instructing, in response to a first search input for which no match is identified, while navigation remains at the search field, and prior to detecting additional input:

display of a no-match indicator; and playback by a screen reader of an announcement indicating that no match is found.

20. One or more non-transitory computer-readable storage media storing programming for execution by one or more processors, the programming comprising instructions to:

instructing display of a user interface that comprises a multiple selection component, the multiple selection component having an open state and a closed state;

detect activation of a control to transition the multiple selection component from the closed state to the open state, the multiple selection component providing an ability to select multiple options from an options list that comprises a plurality of options, a first displayed portion of the plurality of options being displayed in the open state;

instruct, in response to detecting, in the open state, navigation to a particular option in the options list, playback by a screen reader of an announcement indicating a name of the particular option and indicating whether the particular option is selected; and instruct, in response to detecting, in the open state, selection of a first option of the first displayed portion of the plurality of options, playback by a screen reader of an announcement indicating a name of the first option and indicating that the first option has been selected.

* * * * *